United States Patent
Ojiri et al.

(10) Patent No.: US 10,777,785 B2
(45) Date of Patent: Sep. 15, 2020

(54) POWER-CELL PACKAGING MATERIAL

(71) Applicant: DAI NIPPON PRINTING CO., LTD., Tokyo (JP)

(72) Inventors: Tetsuya Ojiri, Tokyo (JP); Tsuyoshi Suzuki, Tokyo (JP); Kazuhiko Yokota, Tokyo (JP); Rikiya Yamashita, Tokyo (JP); Masakazu Kandori, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 75 days.

(21) Appl. No.: 16/259,556

(22) Filed: Jan. 28, 2019

(65) Prior Publication Data

US 2019/0157633 A1 May 23, 2019

Related U.S. Application Data

(63) Continuation of application No. 14/768,651, filed as application No. PCT/JP2014/053624 on Feb. 17, 2014, now Pat. No. 10,236,479.

(30) Foreign Application Priority Data

| Feb. 18, 2013 | (JP) | ................................. 2013-029515 |
| Feb. 18, 2013 | (JP) | ................................. 2013-029516 |

(Continued)

(51) Int. Cl.
*H01M 2/02* (2006.01)
*B32B 15/08* (2006.01)
(Continued)

(52) U.S. Cl.
CPC .............. *H01M 2/029* (2013.01); *B32B 7/02* (2013.01); *B32B 15/08* (2013.01); *B32B 15/085* (2013.01);
(Continued)

(58) Field of Classification Search
None
See application file for complete search history.

(56) References Cited

U.S. PATENT DOCUMENTS

| 8,071,236 B2 | 12/2011 | Seino et al. |
| 2003/0180609 A1 | 9/2003 | Yamashita et al. |

(Continued)

FOREIGN PATENT DOCUMENTS

| DE | 112012001509 T5 | 3/2014 |
| JP | 2003-051291 A | 2/2003 |

(Continued)

OTHER PUBLICATIONS

Apr. 1, 2014 International Search Report issued in International Patent Application No. PCT/JP2014/053624.

(Continued)

*Primary Examiner* — Scott J. Chmielecki
(74) *Attorney, Agent, or Firm* — Oliff PLC

(57) ABSTRACT

A battery packaging material includes a laminate that includes at least a base material layer, a metal layer, an insulating layer, and a sealant layer laminated in this order. The insulating layer is formed of a resin composition containing a modified polyolefin resin modified with an unsaturated carboxylic acid or acid anhydride thereof and has a hardness, when measured by using a nanoindenter and pressing an indenter 5 μm into the insulating layer from a cross-section of the laminate in the laminating direction thereof, that ranges from 10 MPa to 300 MPa. In the sealant layer, an elastic modulus, when measured by using a nanoindenter and pressing an indenter 5 μm into the sealant layer from a cross-section of the laminate in the laminating direction thereof, ranges from 100 MPa to 1000 MPa.

13 Claims, 2 Drawing Sheets

(30) Foreign Application Priority Data

| Feb. 18, 2013 | (JP) | 2013-029517 |
| Jun. 6, 2013 | (JP) | 2013-119705 |
| Jun. 7, 2013 | (JP) | 2013-121020 |

(51) Int. Cl.

| *B32B 7/02* | (2019.01) |
| *B32B 15/20* | (2006.01) |
| *B32B 27/08* | (2006.01) |
| *B32B 27/32* | (2006.01) |
| *B32B 27/28* | (2006.01) |
| *B32B 27/30* | (2006.01) |
| *B32B 15/085* | (2006.01) |
| *B32B 37/06* | (2006.01) |
| *B32B 37/18* | (2006.01) |

(52) U.S. Cl.
CPC ............ *B32B 15/20* (2013.01); *B32B 27/08* (2013.01); *B32B 27/28* (2013.01); *B32B 27/308* (2013.01); *B32B 27/32* (2013.01); *B32B 37/06* (2013.01); *B32B 37/182* (2013.01); *H01M 2/0275* (2013.01); *H01M 2/0277* (2013.01); *H01M 2/0285* (2013.01); *H01M 2/0287* (2013.01); *B32B 2307/51* (2013.01); *B32B 2307/536* (2013.01); *B32B 2307/7265* (2013.01); *B32B 2311/24* (2013.01); *B32B 2323/04* (2013.01); *B32B 2323/10* (2013.01); *B32B 2439/00* (2013.01); *B32B 2457/10* (2013.01); *B32B 2553/00* (2013.01); *H01M 2002/0297* (2013.01)

(56) References Cited

U.S. PATENT DOCUMENTS

| 2006/0014036 | A1 | 1/2006 | Kendig et al. |
| 2006/0093906 | A1* | 5/2006 | Yamashita ............... B32B 27/18 |
| | | | 429/176 |
| 2008/0286635 | A1 | 11/2008 | Seino et al. |
| 2012/0004369 | A1 | 1/2012 | Ogawa et al. |
| 2012/0156546 | A1* | 6/2012 | Amano ................ C08L 63/00 |
| | | | 429/149 |
| 2013/0149597 | A1 | 6/2013 | Suzuta et al. |
| 2013/0209868 | A1 | 8/2013 | Suzuta et al. |
| 2014/0000711 | A1 | 1/2014 | Akasaki et al. |
| 2014/0134475 | A1 | 5/2014 | Kuramoto et al. |
| 2015/0372263 | A1* | 12/2015 | Douke ................ B32B 15/08 |
| | | | 429/176 |

FOREIGN PATENT DOCUMENTS

| JP | 2005-063685 A | 3/2005 |
| JP | 2007-294380 A | 11/2007 |
| JP | 2008-287971 A | 11/2008 |
| JP | 2009-238475 A | 10/2009 |
| JP | 2010-092703 A | 4/2010 |
| JP | 2011-181218 A | 9/2011 |
| JP | 2012-216364 A | 11/2012 |
| WO | 02/058216 A2 | 7/2002 |
| WO | 2012/033133 A1 | 3/2012 |
| WO | 2012/050182 A1 | 4/2012 |
| WO | 2012/121276 A1 | 9/2012 |
| WO | 2012/133683 A1 | 10/2012 |

OTHER PUBLICATIONS

Apr. 14, 2015 Office Action issued in Japanese Patent Application No. 2013-119705.
Sep. 23, 2016 Search Report issued in European Patent Application No. 14751986.2.
Apr. 28, 2017 Office Action issued in U.S. Appl. No. 14/768,651.
May 18, 2018 Office Action issued in U.S. Appl. No. 14/768,651.
Oct. 29, 2018 Notice of Allowance issued in U.S. Appl. No. 14/768,651.

* cited by examiner

POWER-CELL PACKAGING MATERIAL

This is a Continuation of application Ser. No. 14/768,651, filed Aug. 18, 2015, which is a National Stage of PCT/JP2014/053624, filed Feb. 17, 2014, which claims priority to JP 2013-121020 filed Jun. 7, 2013, JP 2013-119705 filed Jun. 6, 2013, JP 2013-029517 filed Feb. 18, 2013, JP 2013-029516 filed Feb. 18, 2013, and JP 2013-029515 filed Feb. 18, 2013. The disclosures of the prior applications are hereby incorporated by reference herein in their entireties.

TECHNICAL FIELD

The present invention relates to a battery packaging material having high insulation quality.

BACKGROUND ART

Conventionally, various types of batteries have been developed. In these batteries, a battery element consisting of electrodes, an electrolyte and so on needs to be sealed in a packaging material or the like. As such a battery packaging material, metal packaging materials are generally used.

In association with the recent advanced performance of electric cars, hybrid electric cars, personal computers, cameras, mobile phones and so on, batteries having a variety of forms are demanded. It is also requested for batteries to have smaller thickness and lighter weight. However, metal packaging materials that are generally used heretofore have difficulty in keeping up with the diversified forms of batteries. Also weight reduction is limited because the packaging materials are made of metal.

Thus, there has been proposed a film-shaped laminate with a base material layer, a metal layer and a sealant layer laminated in this order has been proposed as a battery packaging material which is easily processed into diversified shapes and is capable of achieving thickness reduction and weight reduction.

For example, Patent Document 1 discloses a packaging material for a battery casing, including a biaxially-oriented polyamide film layer as an outer layer, a thermoplastic resin non-oriented film layer as an inner layer, and an aluminum foil layer disposed between these films.

PRIOR ART DOCUMENT

Patent Document

Patent Document 1: Japanese Patent Laid-open Publication No. 2008-287971

SUMMARY OF THE INVENTION

Problems to be Solved by the Invention

However, the present inventors made diligent efforts repeatedly, and found a new problem that in the battery packaging material as disclosed in Patent Document 1, the insulation quality can be deteriorated when the battery packaging material is applied to a battery.

Accordingly, the present inventors further made diligent efforts and revealed that in the manufacturing process of a battery, very small contaminants such as debris of an electrode active material and an electrode tab may stick to the surface of the sealant layer, and the part where the contaminants adhere in the sealant layer can be thinned by the heat and the pressure at the time of heat-sealing a battery element with a battery packaging material. For example, if the sealant layer is thinned in the part where the sealant layers are heat-sealed, there arises the problem that the insulation quality of the battery packaging material is insufficient.

Further, very small contaminants such as debris of an electrode active material and an electrode tab have conductivity. When conductive contaminants exist between an electrode tab and a sealant layer, there is a possibility that the heat and the pressure at the time of heat sealing make the contaminants penetrate in the sealant layer, and the electrode tab and the metal layer of the battery packaging material can be electrically connected to cause a short circuit.

The present invention was devised in consideration of these problems. Specifically, it is a primary object of the present invention to provide a battery packaging material having high insulation quality even when very small contaminants such as debris of an electrode active material and an electrode tab exist in the part that is to be heat-sealed, such as in an interface between the sealant layers or between the electrode tab and the sealant layer.

Means for Solving the Problem

The present inventors made diligent efforts for solving the aforementioned problems. As a result, the inventors found that a battery packaging material having high insulation quality can be obtained by forming the battery packaging material of a laminate including at least a base material layer, a metal layer, an insulating layer and a sealant layer laminated in this order, and letting the hardness, when measured by using a nanoindenter and pressing an indenter 5 μm into the insulating layer from a cross-section of the laminate in the laminating direction thereof, range from 10 MPa to 300 MPa. The present invention was accomplished by further repeating examinations based on these findings.

That is, the present invention provides a battery packaging material, a method for producing the same, and a battery of the following aspects.

Item 1. A battery packaging material comprising a laminate including at least a base material layer, a metal layer, an insulating layer, and a sealant layer laminated in this order, wherein hardness, when measured by using a nanoindenter and pressing an indenter 5 μm into the insulating layer from a cross-section of the laminate in the laminating direction thereof, ranges from 10 MPa to 300 MPa.

Item 2. The battery packaging material according to item 1, wherein the insulating layer is formed of a resin composition containing a modified polyolefin resin modified with an unsaturated carboxylic acid or acid anhydride thereof.

Item 3. The battery packaging material according to item 2, wherein the modified polyolefin resin is formed by modifying at least one of a polyethylene-based resin and a polypropylene-based resin with the unsaturated carboxylic acid or acid anhydride thereof.

Item 4. The battery packaging material according to item 2, wherein the modified polyolefin resin is further modified with a (meth)acrylic acid ester.

Item 5. The battery packaging material according to item 4, wherein the modified polyolefin resin is formed by modifying at least one of a polyethylene-based resin and a polypropylene-based resin with the unsaturated carboxylic acid or acid anhydride thereof and the (meth)acrylic acid ester.

Item 6. The battery packaging material according to any one of items 1 to 5, wherein a melting point of the insulating layer is lower than a melting point of the sealant layer.

Item 7. The battery packaging material according to any one of items 1 to 6, further including a moisture barrier resin layer between the insulating layer and the sealant layer.

Item 8. The battery packaging material according to any one of items 1 to 7, wherein the metal layer is formed of aluminum foil.

Item 9. The battery packaging material according to any one of items 1 to 8, wherein in the sealant layer, an elastic modulus, when measured by using a nanoindenter and pressing an indenter 5 μm into the sealant layer from a cross-section of the laminate in the laminating direction thereof, ranges from 100 MPa to 1000 MPa.

Item 10. The battery packaging material according to any one of items 1 to 9, wherein the insulating layer is formed of a resin composition containing a modified polypropylene-based resin modified with an unsaturated carboxylic acid or acid anhydride thereof and a (meth)acrylic acid ester.

Item 11. The battery packaging material according to any one of items 10, wherein the modified polypropylene-based resin is formed by modifying at least one propylene-based resin selected from the group consisting of a homopolypropylene and a propylene copolymer with an unsaturated carboxylic acid or acid anhydride thereof, and a (meth)acrylic acid ester.

Item 12. The battery packaging material according to item 10 or 11, wherein the insulating layer has a thickness ranging from 0.1 μm to 20 μm.

Item 13. The battery packaging material according to any one of items 10 to 12, wherein the resin composition further contains a curing agent.

Item 14. The battery packaging material according to item 13, wherein the curing agent contains at least one selected from the group consisting of a polyfunctional isocyanate compound, a carbodiimide compound, an epoxy compound and an oxazoline compound.

Item 15. The battery packaging material according to item 13 or 14, wherein the curing agent is composed of two or more compounds.

Item 16. The battery packaging material according to any one of items 13 to 15, wherein in the resin composition, a content of the curing agent ranges from 0.1 part by mass to 50 parts by mass based on 100 parts by mass of the modified polypropylene-based resin.

Item 17. The battery packaging material according to any one of items 1 to 9, wherein the insulating layer is formed of a resin composition containing a modified polyolefin resin modified with an unsaturated carboxylic acid or acid anhydride thereof, and a carbodiimide compound.

Item 18. The battery packaging material according to item 17, wherein the carbodiimide compound is a polycarbodiimide compound.

Item 19. The battery packaging material according to item 17 or 18, wherein the carbodiimide compound is at least one selected from the group consisting of: a polycarbodiimide compound having a repeating unit represented by the following general formula (1):

[Chemical Formula 1]

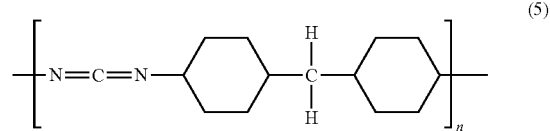

[in the general formula (5), n is an integer of 2 or larger]

a polycarbodiimide compound having a repeating unit represented by the following general formula (6):

[Chemical Formula 2]

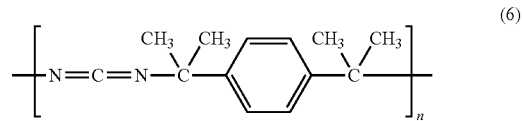

[in the general formula (6), n is an integer of 2 or larger], and a polycarbodiimide compound having a repeating unit represented by the following general formula (7):

[Chemical Formula 3]

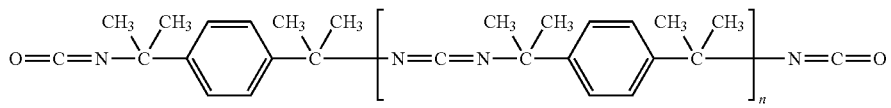

[in the general formula (7), n is an integer of 2 or larger].

Item 20. The battery packaging material according to any one of items 17 to 19, wherein a content of the carbodiimide compound in the resin composition is in a range of 0.01 equivalent to 1.0 equivalent in terms of a carbodiimide group, based on 1 equivalent of carboxyl groups in the modified polyolefin resin.

Item 21. The battery packaging material according to any one of items 17 to 20, wherein the resin composition contains other curing agent, in addition to the carbodiimide compound.

Item 22. The battery packaging material according to item 21, wherein a content of the other curing agent in the resin composition is in a range of 0.05 equivalent to 10 equivalents in terms of a reactive group in the other curing agent based on 1 equivalent of carboxyl groups in the modified polyolefin resin.

Item 23. The battery packaging material according to any one of items 17 to 22, wherein the modified polyolefin resin is formed by modifying at least one of a polyethylene-based resin and a polypropylene-based resin with the unsaturated carboxylic acid or acid anhydride thereof.

Item 24. The battery packaging material according to any one of items 17 to 23, wherein the insulating layer is formed of a resin composition containing a modified polyolefin resin modified with an unsaturated carboxylic acid or acid anhydride thereof and a (meth)acrylic acid ester.

Item 25. The battery packaging material according to item 24, wherein the modified polyolefin resin modified with an unsaturated carboxylic acid or acid anhydride thereof and a (meth)acrylic acid ester is formed by modifying at least one of a polyethylene-based resin and a polypropylene-based resin with the unsaturated carboxylic acid or acid anhydride thereof and the (meth)acrylic acid ester.

Item 26. The battery packaging material according to any one of items 1 to 9, wherein the insulating layer is formed of a resin composition containing (i) at least one of a noncrystalline modified polyolefin resin (A) and a modified polyolefin resin (B) having a melting point of greater than or equal to 110° C., and (ii) a modified polyolefin resin (C) having a melting point of less than or equal to 100° C.

Item 27. The battery packaging material according to item 26, wherein the noncrystalline modified polyolefin resin (A) is at least one selected from the group consisting of a modified polyolefin resin modified with an unsaturated carboxylic acid or acid anhydride thereof, a modified polyolefin resin modified with an unsaturated carboxylic acid or acid anhydride thereof and a (meth)acrylic acid ester, and a modified polyolefin resin having an alcoholic hydroxyl group.

Item 28. The battery packaging material according to item 26 or 27, wherein the modified polyolefin resin (B) having a melting point of greater than or equal to 110° C. is at least one of a modified polyolefin resin modified with an unsaturated carboxylic acid or acid anhydride thereof, and a modified polyolefin resin modified with an unsaturated carboxylic acid or acid anhydride thereof and a (meth)acrylic acid ester.

Item 29. The battery packaging material according to any one of items 26 to 28, wherein the modified polyolefin resin (C) having a melting point of less than or equal to 100° C. is at least one of a modified polyolefin resin modified with an unsaturated carboxylic acid or acid anhydride thereof, and a modified polyolefin resin modified with an unsaturated carboxylic acid or acid anhydride thereof and a (meth)acrylic acid ester.

Item 30. The battery packaging material according to any one of items 26 to 29, wherein the modified polyolefin resin (B) having a melting point of greater than or equal to 110° C. is at least one of a modified polyethylene-based resin and a modified polypropylene-based resin.

Item 31. The battery packaging material according to any one of items 26 to 30, wherein the modified polyolefin resin (C) having a melting point of less than or equal to 100° C. is at least one of a modified polyethylene-based resin and a modified polypropylene-based resin.

Item 32. The battery packaging material according to any one of items 26 to 31, wherein the resin composition further contains a curing agent.

Item 33. The battery packaging material according to item 32, wherein the curing agent contains at least one selected from the group consisting of a polyfunctional isocyanate compound, a carbodiimide compound, an epoxy compound and an oxazoline compound.

Item 34. The battery packaging material according to item 32 or 33, wherein the curing agent is composed of two or more compounds.

Item 35. The battery packaging material according to any one of items 32 to 34, wherein in the resin composition, a content of the curing agent is in a range of 0.1 part by mass to 50 parts by mass, based on a total of 100 parts by mass of (i) a noncrystalline modified polyolefin resin (A) and a modified polyolefin resin (B) having a melting point of greater than or equal to 110° C., and (ii) a modified polyolefin resin (C) having a melting point of less than or equal to 100° C.

Item 36. A battery, wherein a battery element including a positive electrode, a negative electrode and an electrolyte is sealed in the battery packaging material according to any one of items 1 to 35.

Item 37. A method for producing a battery packaging material comprising the step of: laminating at least a base material layer, a metal layer, an insulating layer, and a sealant layer in this order to obtain a laminate, wherein in the step, the insulating layer having a hardness, when measured by using a nanoindenter and pressing the indenter 5 μm into the insulating layer from a cross-section of the laminate in the laminating direction thereof, ranging from 10 MPa to 300 MPa is formed.

Item 38. The production method according to item 37, further comprising, after the step, the step of heating the laminate at a temperature higher or equal to a melting point of the sealant layer.

Item 39. The method for producing a battery packaging material according to item 37 or 38, wherein in the step, the insulating layer is formed of a resin composition containing a modified polypropylene-based resin modified with an unsaturated carboxylic acid or acid anhydride thereof, and a (meth)acrylic acid ester.

Item 40. The method for producing a battery packaging material according to item 37 or 38, wherein in the step, the insulating layer is formed of a resin composition containing a modified polyolefin resin modified with an unsaturated carboxylic acid or acid anhydride thereof, and a carbodiimide compound.

Item 41. The method for producing a battery packaging material according to item 37 or 38, wherein in the step, the insulating layer is formed of a resin composition containing (i) at least one of a noncrystalline modified polyolefin resin (A) and a modified polyolefin resin (B) having a melting point of greater than or equal to 110° C., and (ii) a modified polyolefin resin (C) having a melting point of less than or equal to 100° C.

Advantages of the Invention

According to the battery packaging material of the present invention, it is possible to provide a battery packaging material having high insulation quality even when very small contaminants such as debris of an electrode active material and an electrode tab exist in the part that is to be heat-sealed, such as in an interface between the sealant layers, or between the electrode tab and the sealant layer. That is, by sealing a battery element with the battery packaging material of the present invention, it is possible to improve the insulation quality of the battery.

EMBODIMENTS OF THE INVENTION

The battery packaging material of the present invention is formed of a laminate including at least a base material layer, a metal layer, an insulating layer, and a sealant layer laminated in this order, and has a hardness, when measured by using a nanoindenter and pressing an indenter 5 μm into the insulating layer from a cross-section of the laminate in the laminating direction thereof, ranging from 10 MPa to 300 MPa. Hereinafter, referring to FIGS. 1 to 4, a battery packaging material of the present invention, a method for producing the same, and a battery of the present invention in which a battery element is sealed in the battery packaging material of the present invention will be described in detail.

1. Laminated Structure of Battery Packaging Material

Figure 1:
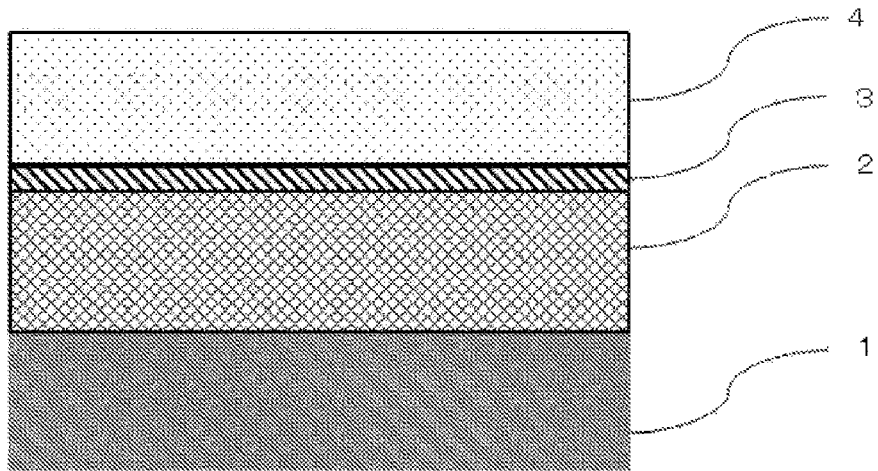
FIG. 1 is a schematic sectional view of one example of a battery packaging material according to the present invention.

The battery packaging material of the present invention is formed of a laminate including at least a base material layer 1, a metal layer 2, an insulating layer 3, and a sealant layer 4 laminated in this order as illustrated, for example, in FIG. 1. In the battery packaging material, the base material layer 1 is the outermost layer, and the sealant layer 4 is the innermost layer. That is, in assembling a battery, by wrapping a battery element in the battery packaging material in such a manner that the sealant layer 4 of the battery packaging material is inside the battery, and heat-welding the sealant layers 4 positioned on the periphery of the battery element to hermetically seal the battery element, the battery element is sealed.

Figure 2:
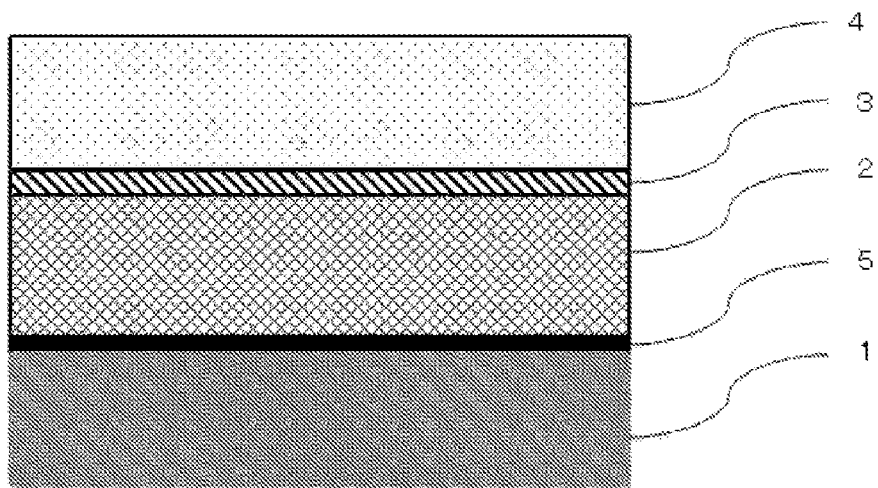
FIG. 2 is a schematic sectional view of one example of a battery packaging material according to the present invention.
Figure 3:
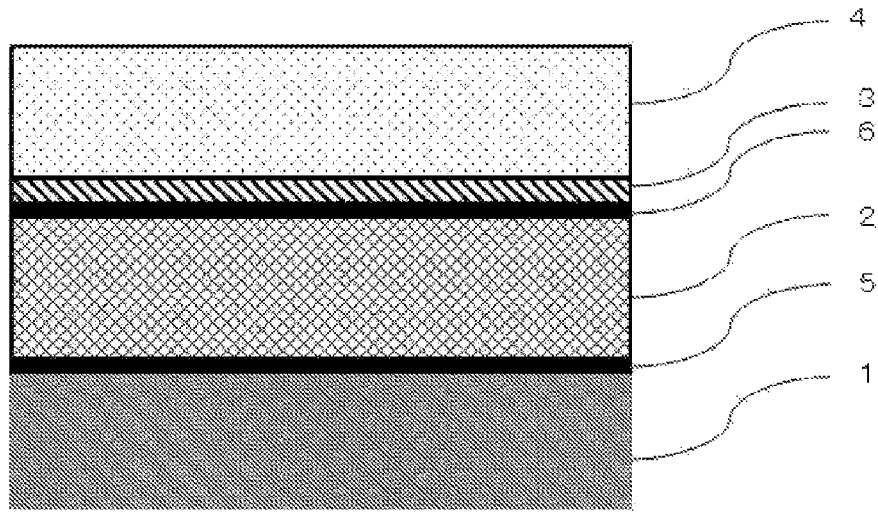
FIG. 3 is a schematic sectional view of one example of a battery packaging material according to the present invention.
Figure 4:
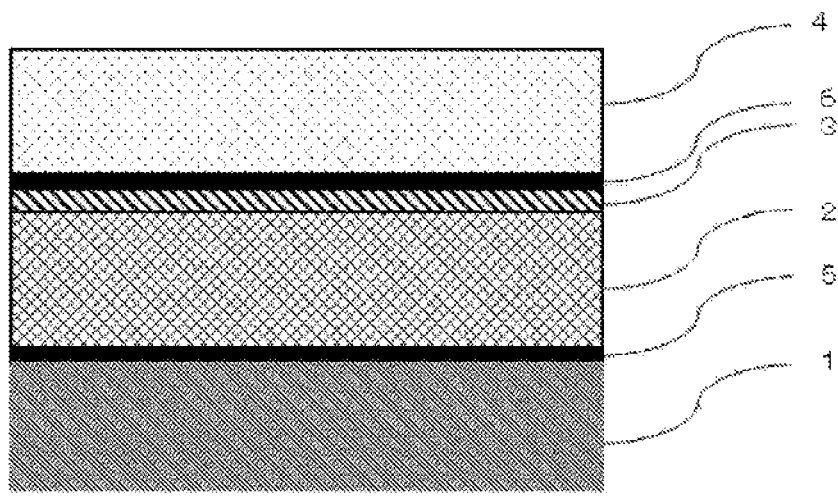
FIG. 4 is a schematic sectional view of one example of a battery packaging material according to the present invention.

The battery packaging material of the present invention is only required to include at least the base material layer 1, the metal layer 2, the insulating layer 3, and the sealant layer 4, and may further include other layer. For example, as will be described later, in the battery packaging material of the present invention, as shown in FIG. 2, for example, an adhesive layer 5 may be provided between the base material layer 1 and the metal layer 2 as necessary for the purpose of improving adhesion therebetween. Further, as shown in FIG. 3, for example, a moisture barrier resin layer 6 may be provided between the metal layer 2 and the insulating layer 3 as necessary for the purpose of controlling the moisture permeability from the end surface of the battery packaging material and improving the durability of the battery. Also as shown in FIG. 4, for example, the moisture barrier resin layer 6 may be provided between the insulating layer 3 and the sealant layer 4. Further, other layer may be formed outside the base material layer 1 for the purpose of imparting, for example, the design.

2. Composition of Each Layer Forming Battery Packaging Material

[Base Material Layer 1]

In the battery packaging material of the present invention, the base material layer 1 forms the outermost layer when a battery is assembled. The material that forms the base material layer 1 is not particularly limited as long as it has the insulation quality. Examples of the material that forms the base material layer 1 include resins films of polyester resin, polyamide resin, epoxy resin, acrylic resin, fluororesin, polyurethane resin, silicon resin, phenol resin and mixtures and copolymers thereof.

Concrete examples of polyester resin include polyethylene terephthalate, polybutylene terephthalate, polyethylene naphthalate, polybutylene naphthalate, copolyester and polycarbonate. Concrete examples of polyamide resin include nylon 6, nylon 6,6, copolymer of nylon 6 and nylon 6,6, nylon 6,10, and polymethaxylyleneadipamide (MXD6). Among them, nylons and polyesters are preferred, and biaxially-oriented nylons and biaxially-oriented polyesters are further preferred, with biaxially-oriented nylons being especially preferred, as the material that forms the base material layer 1.

The base material layer 1 may be formed of a single layer resin film, or may be formed of a multilayered resin film having two or more layers. When the base material layer 1 is formed of a multilayer resin film, the pinhole resistance and the insulation quality of the battery packaging material of the present invention can be improved. When the base material layer 1 is formed of a multilayer resin film, the two or more resin films can be laminated, for example, via an adhesive. The kind, amount and the like of the adhesive used in this case can be similar to those in the case of the later-described adhesive layer 5.

Thickness of the base material layer 1 is not particularly limited, and for example, it may be about 5 μm to 50 μm, preferably about 12 μm to 30 μm.

[Metal Layer 2]

In the battery packaging material of the present invention, the metal layer 2 is a layer that is intended to improve the strength of the packaging material, and also functions as a barrier layer for preventing ingress of water vapor, oxygen, light and the like into the battery. Concrete examples of the metal forming the metal layer 2 include aluminum, stainless and titanium, with aluminum being preferred. The metal layer 2 can be formed by metal foil or metal vapor deposition, and is preferably formed by metal foil, more preferably formed by aluminum foil. From the view point of preventing occurrence of wrinkles, pinholes and the like in the metal layer 2 during production of the battery packaging material, it is more preferred to form by soft aluminum foil such as annealed aluminum (JIS A8021P-O, JIS A8079P-O).

While the thickness of the metal layer 2 is not particularly limited, it can be, for example, about 10 μm to 200 μm, preferably about 20 μm to 100 μm.

The metal layer 2 is subjected to a chemical conversion treatment on at least either one face, preferably on both faces for the purpose of stabilizing adhesion and preventing dissolution or corrosion. Here, the chemical conversion treatment is a treatment for forming an acid resistance film on the surface of the metal layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4).

[Chemical Formula 4]

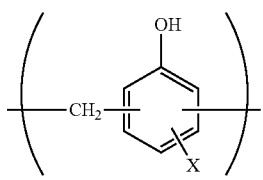

(1)

[Chemical Formula 5]

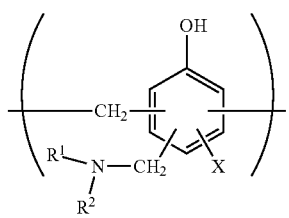

(2)

[Chemical Formula 6]

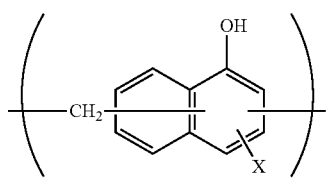

(3)

[Chemical Formula 7]

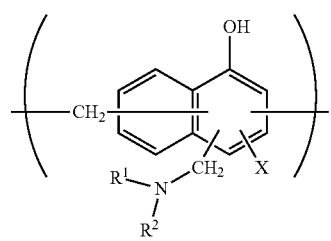

(4)

In the general formulae (1) to (4), X represents a hydrogen atom, a hydroxyl group, an alkyl group, a hydroxyalkyl group, an allyl group or a benzyl group. $R_1$ and $R_2$ are the same or different, and each represent a hydroxyl group, an alkyl group or a hydroxyalkyl group. In the general formulae (1) to (4), examples of the alkyl group represented by X, $R_1$ and $R_2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxyalkyl group represented by X, $R_1$ and $R_2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl group and the hydroxyalkyl group represented by X, $R^1$ and $R^2$ may be the same or different from each other. In the general formulae (1) to (4), X is preferably a hydrogen atom, a hydroxyl group, or a hydroxyalkyl group. A number average molecular weight of the aminated phenol polymer having repeating units represented by the general formulae (1) to (4) is preferably about 500 to 1000000, and more preferably about 1000 to 20000, for example.

Examples of the chemical conversion treatment method for imparting corrosion resistance to the metal layer 2 include a method in which the metal layer 2 is coated with a dispersion of fine particles of a metal oxide such as aluminum oxide, titanium oxide, cerium oxide or tin oxide or barium sulfate in phosphoric acid, and annealed at 150° C. or higher to form corrosion resistance treatment layer on the surface of the metal layer 2. A resin layer with a cationic polymer crosslinked with a crosslinking agent may be formed on the corrosion resistance treatment layer. Here, examples of the cationic polymer include polyethyleneimine, ion polymer complexes composed of a polymer having polyethyleneimine and a carboxylic acid, primary amine-grafted acrylic resins obtained by grafting primary amine to an acryl backbone, polyallylamine or derivatives thereof, and aminophenol. The cationic polymer may be used singly or in combination of two cationic polymers. Examples of the crosslinking agent include compounds having at least one functional group selected from the group consisting of an isocyanate group, a glycidyl group, a carboxyl group and an oxazoline group, and silane coupling agents. The crosslinking agent may be used singly or in combination of two or more crosslinking agents.

As for the chemical conversion treatment, only one chemical conversion treatment may be conducted, or combination of two or more chemical conversion treatments may be conducted. The chemical conversion treatment may be performed using one compound alone, or may be performed using two or more compounds in combination. Among the chemical conversion treatments, a chromic acid chromate treatment, and a chromate treatment using a chromic acid compound, a phosphoric acid compound, and an aminated phenol polymer in combination are preferred.

The amount of the acid resistance film to be formed on the surface of the metal layer 2 in the chemical conversion treatment is not particularly limited, but for example when a chromate treatment is performed, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 to about 40 mg, in terms of phosphorus, and the aminated phenol polymer be contained in an amount of about 1 mg to 200 mg, preferably about 5.0 mg to 150 mg, per 1 $m^2$ of the surface of the metal layer 2.

The chemical conversion treatment is performed in the following manner: a solution containing a compound to be used for formation of an acid resistance film is applied to the surface of the metal layer by a bar coating method, a roll coating method, a gravure coating method, an immersion method or the like, and heating is then performed so that the temperature of the metal layer is about 70° C. to 200° C. The metal layer may be subjected to a degreasing treatment by an alkali immersion method, an electrolytic cleaning method, an acid cleaning method, an electrolytic acid cleaning method or the like before the metal layer is subjected to a chemical conversion treatment. By conducting such a degreasing treatment, it is possible to conduct the chemical conversion treatment of the surface of the metal layer more efficiently.

[Insulating Layer 3]

In the present invention, the insulating layer 3 is a layer provided between the metal layer 2 and the sealant layer 4 for the purpose of improving the insulation quality of the battery packaging material. The insulating layer 3 has a hardness, when measured by using a nanoindenter and pressing the indenter 5 μm into the insulating layer 3 from a cross-section of the laminate in the laminating direction thereof, ranging from 10 MPa to 300 MPa. The hardness of the insulating layer 3 is more concretely the hardness determined by pressing an indenter made of a diamond chip having a tip end in the form of a triangular pyramid (Berkovich type) 5 µm into the insulating layer 3 from the cross-section of the laminate in the laminating direction thereof by using a nanoindenter, and measuring the hardness when the indenter is pressed in (nanoindenter hardness). The hardness is measured in a so-called nanoindentation method.

The hardness of the insulating layer 3 preferably ranges from 10 MPa to 300 MPa, more preferably ranges from 15 MPa to 250 MPa. In the battery packaging material of the present invention, since the insulating layer 3 having such a specific hardness is provided between the metal layer 2 and the sealant layer 4, the insulation quality and the durability of the battery packaging material are improved even when very small contaminants such as debris of an electrode active material and an electrode tab exist in the part that is to be heat-sealed, such as in an interface between the sealant layers, or between the electrode tab and the sealant layer.

The insulating layer 3 may have a multilayer structure having two or more layers. Hereby, insulation quality can be maintained by second and third insulating layers even when thin parts and through-holes are formed in the first insulating layer as well as the sealant layer 4.

The material constituting the insulating layer 3 is not particularly limited as long as it has the insulation quality and the hardness as specified above. The insulating layer 3 can be formed, for example, of a resin composition. From the view point of improving the insulation quality of the battery packaging material, the resin composition preferably contains a modified polyolefin resin.

As the modified polyolefin resin, a modified polyolefin resin modified with an unsaturated carboxylic acid or acid anhydride thereof is preferably used. Further, the modified polyolefin-based resin may further be modified with a (meth)acrylic acid ester. By forming the insulating layer 3 of the resin composition containing such a modified polyolefin-based resin, not only adhesion between the insulating layer 3 and the metal layer 2 or the sealant layer 4, and the insulation quality of the battery packaging material are improved, but also the durability can be improved. The modified polyolefin resin further modified with a (meth) acrylic acid ester can be obtained by acid modifying a polyolefin resin by using an unsaturated carboxylic acid or acid anhydride thereof and a (meth)acrylic acid ester in combination.

In the present invention, "(meth)acrylic acid ester" means "acrylic acid ester" or "(meth)acrylic acid ester".

The polyolefin to be modified is not particularly limited as long as it is a resin containing at least an olefin as a monomer unit. The polyolefin resin can be formed from, for example, at least one of a polyethylene-based resin and a polypropylene-based resin, and is preferably formed from a polypropylene-based resin. The polyethylene-based resin can be formed from, for example, at least one of homo-polyethylene and an ethylene copolymer. The polypropylene-based resin can be formed from, for example, at least one of homo-polypropylene and a propylene copolymer. Examples of the propylene copolymer include copolymers of propylene and other olefins, such as ethylene-propylene copolymers, propylene-butene copolymers and ethylene-propylene-butene copolymers. The ratio of propylene units contained in the polypropylene-based resin is preferably about 50 mol % to 100 mol %, more preferably about 80 mol % to 100 mol % for further improving the insulation quality and durability of the battery packaging material. The ratio of ethylene units contained in the polyethylene-based resin is preferably about 50 mol % to 100 mol %, more preferably about 80 mol % to 100 mol % for further improving the insulation quality and durability of the battery packaging material. The ethylene copolymer and the propylene copolymer may each be either a random copolymer or a block copolymer. The ethylene copolymer and the propylene copolymer may each be either crystalline or noncrystalline, or may each be a copolymer or mixture of the crystalline and noncrystalline copolymers. The polyolefin resin may be formed of one homopolymer or copolymer, or may be formed of two or more homopolymers or copolymers.

Examples of the unsaturated carboxylic acid include acrylic acid, methacrylic acid, maleic acid, itaconic acid, fumaric acid and crotonic acid. As the acid anhydride, acid anhydrides of the unsaturated carboxylic acids shown above as an example are preferred, and maleic anhydride and itaconic anhydride are more preferred. The modified polypropylene-based resin may be modified with one unsaturated carboxylic acid or acid anhydride thereof, or may be modified with two or more unsaturated carboxylic acids or acid anhydrides thereof.

The (meth)acrylic acid ester is, for example, an esterified product of (meth)acrylic acid and an alcohol with a carbon number of 1 to 30, preferably an esterified product of (meth)acrylic acid and an alcohol with a carbon number of 1 to 20. Specific examples of the (meth)acrylic acid ester include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth) acrylate, octyl (meth)acrylate, dodecyl (meth)acrylate and stearyl (meth)acrylate. In modification of the polyolefin resin, only one (meth)acrylic acid ester may be used, or two or more (meth)acrylic acid esters may be used.

The ratio of the unsaturated carboxylic acid or acid anhydride thereof in the modified polyolefin resin is preferably about 0.1% by mass to 30% by mass, more preferably about 0.1% by mass to 20% by mass. When the ratio of the (meth)acrylic acid ester in the acid-modified polyolefin resin falls within the above-mentioned range, the insulation quality and durability of the battery packaging material can be improved.

The ratio of the (meth)acrylic acid ester in the modified polyolefin resin is preferably about 0.1% by mass to 40% by mass, more preferably about 0.1% by mass to 30% by mass. When the ratio of the (meth)acrylic acid ester in the acid-modified polyolefin resin falls within the above-mentioned range, the insulation quality and durability of the battery packaging material can be improved.

The weight average molecular weight of the modified polyolefin resin is preferably about 6000 to 200000, more preferably about 8000 to 150000. When the weight average molecular weight of the modified polyolefin resin falls within the above-mentioned range, affinity of the insulating layer 3 to the metal layer 2 and the sealant layer 4 can be stabilized, and therefore adhesion between the metal layer 2 and the sealant layer 4 can be stabilized over a long period of time. Further, heat resistance can be improved, so that the insulation quality and durability of the battery packaging material can be further improved. The weight average molecular weight of the modified polypropylene-based resin is a value obtained by performing measurement by gel permeation chromatography (GPC) under the condition of using polystyrene as a standard sample. The melting point of the modified polyolefin resin is preferably in a range of about 60° C. to 160° C., more preferably in a range of about 70° C. to 140° C. When the weight average molecular weight of the modified polyolefin resin falls within the above-mentioned range, affinity of the insulating layer 3 to the metal layer 2 and the sealant layer 4 can be stabilized, and therefore adhesion between the metal layer 2 and the sealant layer 4 can be stabilized over a long period of time. Further, heat resistance can be improved, so that the insulation quality and durability of the battery packaging material can be further improved. In the present invention, the melting point of the modified polyolefin resin refers to an endothermic peak temperature in differential scanning calorimetry.

For the modified polyolefin resin, the method for modifying a polyolefin resin is not particularly limited, and for example, an unsaturated carboxylic acid or acid anhydride thereof, or a (meth)acrylic acid ester may be copolymerized with a polyolefin resin. Copolymerization in this case is random copolymerization, block copolymerization, graft copolymerization (graft modification) or the like, with graft copolymerization being preferred.

As described above, in the production process of batteries, very small contaminants such as debris of an electrode active material and an electrode tab may stick to the surface of the sealant layer, and accordingly thin parts and through-holes may be generated in the sealant layer, leading to deterioration of insulation quality. On the other hand, in the battery packaging material of the present invention, the hard insulating layer 3 formed of a modified polyolefin resin is formed as described above, and the insulating layer 3 which exhibits high heat resistance and mechanical strength at the time of application of heat during heat-sealing, and has high flexibility, and is able to prevent generation of fine cracks due to stress associated with bending or the like is formed. Therefore, even when fine cracks that are easily generated at thin parts, through-holes that are generated by contaminants etc., voids resulting from foaming of the sealant layer which occurs in the case where the sealant layer is heat-sealed while catching an electrolytic solution, or the like are formed in the sealant layer 4, the electrolytic solution can be prevented from coming into direct contact with the metal layer by the insulating layer 3, so that the metal layer 2 is protected. Even when the sealant layer 4 catches contaminants etc., deterioration of the insulation quality of the battery packaging material by contaminants can be prevented by the insulating layer 3 having high heat resistance and high mechanical strength and flexibility.

The curing agent is not particularly limited as long as it cures the modified polypropylene-based resin. Examples of the curing agent include polyfunctional isocyanate compounds, carbodiimide compounds, epoxy compounds and oxazoline compounds.

The polyfunctional isocyanate compound is not particularly limited as long as it is a compound having two or more isocyanate groups. Specific examples of the polyfunctional isocyanate compound include isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers.

The carbodiimide compound is not particularly limited as long as it is a compound having at least one carbodiimide group (—N=C=N—). The carbodiimide compound is preferably a polycarbodiimide compound having at least two carbodiimide groups. Specific examples of the particularly preferred carbodiimide compound include polycarbodiimide compounds having a repeating unit represented by the following general formula (5):

[Chemical Formula 8]

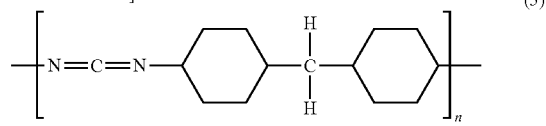

(5)

[in the general formula (5), n is an integer of 2 or larger]

a polycarbodiimide compound having a repeating unit represented by the following general formula (6):

[Chemical Formula 9]

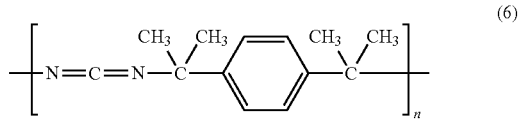

(6)

[in the general formula (6), n is an integer of 2 or larger], and a polycarbodiimide compound having a repeating unit represented by the following general formula (7):

[Chemical Formula 10]

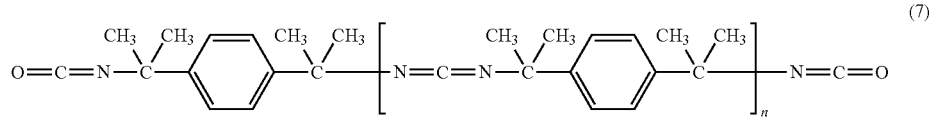

(7)

[in the general formula (7), n is an integer of 2 or larger]. In the general formulae (5) to (7), n is normally an integer of 30 or smaller, preferably an integer of 3 to 20.

The epoxy compound is not particularly limited as long as it is a compound having at least one epoxy group. Examples of the epoxy compound include epoxy resins such as bisphenol A diglycidyl ether, modified bisphenol A diglycidyl ether, novolak glycidyl ether, glycerin polyglycidyl ether and polyglycerin polyglycidyl ether.

The oxazoline compound is not particularly limited as long as it is a compound having an oxazoline backbone. Specific examples of the oxazoline compound include EPOCROS Series from Nippon Shokubai Co., Ltd.

The curing agent may be formed of two or more compounds from the view point of increasing the mechanical strength of the insulating layer 3, etc.

In the resin composition, a content of the curing agent is preferably in a range of 0.1 part by mass to 50 parts by mass, more preferably in a range of 0.1 part by mass to 30 parts by mass based on 100 parts by mass of the modified polypropylene-based resin. In the resin composition, a content of the curing agent is preferably in a range of 1 equivalent to 30 equivalents, more preferably in a range of 1 equivalent to 20 equivalents in terms of a reactive group in the curing agent based on 1 equivalent of carboxyl groups in the modified polypropylene-based resin. Accordingly, the insulation quality and durability of the battery packaging material can be improved.

The thickness of the insulating layer 3 may be, for example, about 0.1 µm to 20 µm, preferably 0.5 µm to 15 µm while it is not particularly limited as long as it is a thickness suitable for the battery packaging material. The packaging material according to the present invention is molded into various shapes in conformity to the shape of the battery, and therefore required to have a certain degree of flexibility. By making the thickness of the insulating layer 3 fall within the above-mentioned range in the battery packaging material, insulation can be improved while the flexibility of the battery packaging material is retained. The melting point of the insulating layer 3 is preferably lower than the melting point of the later-described sealant layer 4. This makes it possible to alleviate the stress of the sealant layer 4 applied at the time of sealing, and to prevent deterioration of insulation quality due to thinning of the sealant layer 4. In the present invention, the melting point of the insulating layer means the melting point of the component constituting the insulating layer. When the insulating layer is formed of a resin composition, the melting point of the insulating layer refers to an endothermic peak temperature in differential scanning calorimetry of the resin composition.

By adding an olefin-based rubber-like additive or a hydrocarbon-based wax to the insulating layer 3, higher flexibility can be imparted to the insulating layer 3 to suppress collapse in case of catching contaminants due to stress distribution during compression and to prevent generation of fine cracks during stretching. Examples of the olefin-based rubber-like additive include α-olefin copolymers such as TAFMER P, TAFMER A, TAFMER H, TAFMER XM, TAFMER BL and TAFMER PN from Mitsui Chemicals, Incorporated and TAFTHREN from Sumitomo Chemical Company, Limited. Examples of the hydrocarbon-based wax include paraffins.

Further, in the battery packaging material of the present invention, preferred concrete Exemplary embodiments A to C of the insulating layer 3 will be described in detail. In Exemplary embodiments A to C, the configuration of the insulating layer 3 that is not described in the following Exemplary embodiments A to C is as described above.

Exemplary Embodiment A

Preferred exemplary embodiment A of the insulating layer 3 is characterized in that the insulating layer 3 is formed of a resin composition containing a modified polypropylene-based resin that is modified with an unsaturated carboxylic acid or acid anhydride thereof and a (meth)acrylic acid ester. The modified polypropylene-based resin can be obtained by acid modifying a polypropylene-based resin by using an unsaturated carboxylic acid or acid anhydride thereof and a (meth)acrylic acid ester in combination. In the battery packaging material of Exemplary embodiment A, since the insulating layer 3 formed of such a specific resin composition is provided between the metal layer 2 and the sealant layer 4, even when very small contaminants such as debris of an electrode active material and an electrode tab exist between the battery element and the sealant layer, the insulation quality and the durability of the battery packaging material are improved.

In Exemplary embodiment A, the polypropylene-based resin to be modified is not particularly limited as long as it is a resin containing at least propylene as a monomer unit. The polypropylene-based resin can be formed from, for example, at least one of homo-polypropylene and a propylene copolymer. Examples of the propylene copolymer include copolymers of propylene and other olefins, such as ethylene-propylene copolymers, propylene-butene copolymers and ethylene-propylene-butene copolymers. The propylene copolymer may be either a random copolymer or a block copolymer. The propylene copolymer may be either crystalline or noncrystalline, or may be a copolymer or mixture of these. The polypropylene-based resin may be formed of one homopolymer or copolymer, or may be formed of two or more homopolymers or copolymers.

The ratio of propylene units contained in the polypropylene-based resin is preferably about 50 mol % to 100 mol %, more preferably about 80 mol % to 100 mol % for further improving the insulation quality and durability of the battery packaging material.

As the unsaturated carboxylic acid, those as described above can be recited. As the (meth)acrylic acid ester, those as described above can be recited. The modified polypropylene-based resin may be modified with one (meth)acrylic acid ester, or may be modified with two or more (meth)acrylic acid esters.

The ratio of the unsaturated carboxylic acid or acid anhydride thereof in the modified polypropylene-based resin is preferably about 0.1% by mass to 30% by mass, more preferably about 0.1% by mass to 20% by mass. When the ratio of the (meth)acrylic acid ester in the acid-modified polyolefin resin falls within the above-mentioned range, the insulation quality and durability of the battery packaging material can be improved.

The ratio of the (meth)acrylic acid ester in the modified polypropylene-based resin is preferably about 0.1% by mass to 40% by mass, more preferably about 0.1% by mass to 30% by mass. When the ratio of the (meth)acrylic acid ester in the acid-modified polyolefin resin falls within the above-mentioned range, the insulation quality and durability of the battery packaging material can be improved.

The ratio of the unsaturated carboxylic acid or acid anhydride thereof and the ratio of the (meth)acrylic acid ester in the modified polypropylene-based resin can be determined by $^1$H-NMR analysis.

The weight average molecular weight of the modified polypropylene-based resin is as described above. Also the melting point of the modified polypropylene-based resin is as described above.

The method for modifying the polypropylene-based resin is not particularly limited as long as the unsaturated carboxylic acid or acid anhydride thereof and a (meth)acrylic acid ester are copolymerized with the polypropylene-based resin. Copolymerization in this case is random copolymerization, block copolymerization, graft copolymerization (graft modification) or the like, with graft copolymerization being preferred.

In the production process of batteries, very small contaminants such as debris of an electrode active material and an electrode tab may stick to the surface of the sealant layer, and accordingly thin parts and through-holes may be generated in the sealant layer, leading to deterioration of insulation quality of the battery packaging material. On the other hand, the battery packaging material of Exemplary embodiment A is formed with the insulating layer 3 which is formed of a modified polypropylene-based resin as described above and which exhibits high heat resistance and mechanical strength at the time of application of heat during heat-sealing, and has high flexibility, and is capable of preventing generation of fine cracks due to stress associated with bending or the like. Therefore, even when fine cracks that are easily generated at thin parts, through-holes that are generated by contaminants etc., voids resulting from foaming of the sealant layer which occurs in the case where the sealant layer is heat-sealed while catching an electrolytic solution, or the like are formed in the sealant layer 4, the electrolytic solution can be prevented from coming into direct contact with the metal layer by the insulating layer 3, so that the metal layer 2 is protected. Even when the sealant layer 4 catches contaminants etc., deterioration of the insulation quality of the battery packaging material by contaminants can be prevented by the insulating layer 3 having high heat resistance and high mechanical strength and flexibility. Further, since the insulating layer 3 has high affinity with the metal layer 2 and the sealant layer 4, adhesion between the insulating layer 3 and the metal layer 2 or the sealant layer 4 is high, and excellent durability is realized.

Also in Exemplary embodiment A, the resin composition forming the insulating layer 3 may further contain the curing agent. The curing agent contained in the resin composition makes it possible to increase the mechanical strength of the insulating layer 3.

Exemplary Embodiment B

Preferred exemplary embodiment B of the insulating layer 3 is characterized in that the insulating layer 3 is formed of a resin composition containing a modified polyolefin resin modified with an unsaturated carboxylic acid or acid anhydride thereof, and the carbodiimide compound. The modified polyolefin-based resin may further be modified with a (meth)acrylic acid ester. In Exemplary embodiment B, by forming the insulating layer 3 of a resin composition containing such a modified polyolefin-based resin and the carbodiimide compound, it is possible to improve the insulation quality and the durability of the battery packaging material. As the modified polyolefin resin, two modified polyolefin resins: a modified polyolefin resin modified with an unsaturated carboxylic acid or acid anhydride thereof, and additionally a modified polyolefin resin modified further with a (meth)acrylic acid ester may be used in mixture. The modified polyolefin resin modified further with a (meth) acrylic acid ester is obtained by modifying a polyolefin resin using an unsaturated carboxylic acid or acid anhydride thereof in combination with a (meth)acrylic acid ester.

The kinds and amounts of the polyolefin resin to be modified, the unsaturated carboxylic acid, the (meth)acrylic acid ester, the carbodiimide compound and so on are as described above.

As described above, in the production process of batteries, very small contaminants such as debris of an electrode active material and an electrode tab may stick to the surface of the sealant layer, and accordingly thin parts and through-holes may be generated in the sealant layer, leading to deterioration of insulation quality of the battery packaging material. On the other hand, the battery packaging material of Exemplary embodiment B is provided with the insulating layer 3 which is formed of a resin composition containing a modified polyolefin resin and a carbodiimide compound as described above and which exhibits high mechanical strength. Therefore, the insulating layer 3 is formed that exhibits high heat resistance and mechanical strength at the time of application of heat during heat-sealing, and high flexibility, and is able to prevent generation of fine cracks due to stress associated with bending or the like. Therefore, even when fine cracks that are easily generated at thin parts, through-holes that are generated by contaminants etc., voids resulting from foaming of the sealant layer which occurs in the case where the sealant layer is heat-sealed while catching an electrolytic solution, or the like are formed in the sealant layer 4, the electrolytic solution can be prevented from coming into direct contact with the metal layer by the insulating layer 3, so that the metal layer 2 is protected. Even when the sealant layer 4 catches contaminants etc., deterioration of the insulation quality of the battery packaging material by contaminants can be prevented by the insulating layer 3 having high heat resistance and high mechanical strength and flexibility. Further, in Exemplary embodiment B, since the insulating layer 3 has high affinity with the metal layer 2 and the sealant layer 4, adhesion between the insulating layer 3 and the metal layer 2 or the sealant layer 4 is high, and excellent durability is realized.

The resin composition that forms the insulating layer 3 may further contain other curing agent such as a polyfunctional isocyanate compound, an epoxy compound and an oxazoline compound in addition to the carbodiimide compound for the purpose of curing the modified polyolefin-based resin. By containing such other curing agent in the resin composition, it is possible to improve adhesion between the insulating layer 3 and the metal layer 2 or the sealant layer 4 while further improving the mechanical strength of the insulating layer 3.

Exemplary Embodiment C

Preferred exemplary embodiment C of the insulating layer 3 is characterized in that the insulating layer 3 is formed of a resin composition containing (i) at least one of a noncrystalline modified polyolefin resin (A) and a modified polyolefin resin (B) having a melting point of greater than or equal to 110° C., and (ii) a modified polyolefin resin (C) having a melting point of less than or equal to 100° C. In Exemplary embodiment C, the insulating layer 3 formed of such a specific resin composition is provided between the metal layer 2 and the sealant layer 4, and thus even when very small contaminants such as debris of an electrode active material and an electrode tab exist between the battery element and the sealant layer, the insulation quality and the durability of the battery packaging material are improved. In other words, in Exemplary embodiment C, as a result of forming the insulating layer 3 of one of the following resin compositions (1) to (3), the effect of improving the insulation quality and the durability as described above is exhibited.

(1) a resin composition containing (i) a noncrystalline modified polyolefin resin (A), and (ii) a modified polyolefin resin (C) having a melting point of less than or equal to 110° C.

(2) a resin composition containing (i) a modified polyolefin resin (B) having a melting point of greater than or equal to 110° C., and (ii) a modified polyolefin resin (C) having a melting point of less than or equal to 100° C.

(3) a resin composition containing (i) a noncrystalline modified polyolefin resin (A) and a modified polyolefin resin (B) having a melting point of greater than or equal to 110° C., and (ii) a modified polyolefin resin (C) having a melting point of less than or equal to 100° C.

In Exemplary embodiment C, the noncrystalline modified polyolefin resin refers to a modified polyolefin resin having substantially no melting point with the crystallinity degree reduced by using an atactic polymer having a low tacticity.

In Exemplary embodiment C, the melting point of the modified polyolefin resin refers to an endothermic peak temperature in differential scanning calorimetry.

The noncrystalline modified polyolefin resin (A) is not particularly limited, and a known noncrystalline modified polyolefin resin can be used. From the view point of improving the insulation quality and the durability of the battery packaging material by using the later-described modified polyolefin resin (C) having a melting point of less than or equal to 100° C. in combination, preferred examples of the noncrystalline modified polyolefin resin (A) include a modified polyolefin resin modified with an unsaturated carboxylic acid or acid anhydride thereof, a modified polyolefin resin modified with an unsaturated carboxylic acid or acid anhydride thereof and a (meth)acrylic acid ester, and a modified polyolefin resin having an alcoholic hydroxyl group, and more preferred examples include a modified polyolefin resin having an alcoholic hydroxyl group. As the noncrystalline modified polyolefin resin (A), one resin may be used alone, or two or more resins may be used in combination.

In the noncrystalline modified polyolefin resin (A), the modified polyolefin resin modified with an unsaturated carboxylic acid or acid anhydride thereof is not particularly limited, and for example, those exemplified for the later-described modified polyolefin resin (B) having a melting point of greater than or equal to 110° C. can be recited. The modified polyolefin resin modified with an unsaturated carboxylic acid or acid anhydride thereof and a (meth)acrylic acid ester is not particularly limited, and for example, those exemplified for the later-described modified polyolefin resin (B) having a melting point of greater than or equal to 110° C. can be recited. The acid values of the modified polyolefin resin modified with an unsaturated carboxylic acid or acid anhydride thereof, and the modified polyolefin resin modified with an unsaturated carboxylic acid or acid anhydride thereof and a (meth)acrylic acid ester are not particularly limited, and each may be, for example about 20 to 60, preferably about 25 to 55.

The modified polyolefin resin having an alcoholic hydroxyl group is not particularly limited, and for example, a modified polyolefin resin having at least one alcoholic hydroxyl group in the polyolefin backbone can be recited. The number of hydroxyl groups bound to the polyolefin backbone is not particularly limited, and for example, it may be preferably about 20 to 60, more preferably about 30 to 50 in terms of a hydroxyl value which is an index of polarity in the polymer. The hydroxyl value can be determined in accordance with the method provided in JISK1557-1. The modified polyolefin resin having an alcoholic hydroxyl group preferably has a hydroxyl group at the end of the polyolefin backbone.

While the weight average molecular weight of the noncrystalline modified polyolefin resin (A) is not particularly limited, it is preferably about 6000 to 200000, more preferably about 8000 to 150000. When the weight average molecular weight falls within the aforementioned range, it is possible to stabilize the affinity of the insulating layer 3 with the metal layer 2 and the sealant layer 4 when the later-described modified polyolefin resin (C) having a melting point of less than or equal to 100° C. is used in combination, and thus it is possible to stabilize adhesion between the metal layer 2 and the sealant layer 4 over a long period of time. Further, since heat resistance can be improved, the insulation quality and the durability of the battery packaging material can be further improved. In Exemplary embodiment C, the weight average molecular weight of the modified polyolefin resin is a value obtained by performing measurement by gel permeation chromatography (GPC) under the condition of using polystyrene as a standard sample.

While the modified polyolefin resin (B) having a melting point of greater than or equal to 110° C. is not particularly limited, from the view point of improving the insulation quality and the durability of the battery packaging material by using the later-described modified polyolefin resin (C) having a melting point of less than or equal to 100° C. in combination, it is preferably at least one of a modified polyolefin resin modified with an unsaturated carboxylic acid or acid anhydride thereof, and a modified polyolefin resin modified with an unsaturated carboxylic acid or an acid anhydride thereof and a (meth)acrylic acid ester.

Here, in Exemplary embodiment C, the modified polyolefin resin modified with an unsaturated carboxylic acid or acid anhydride thereof is obtained by modifying a polyolefin resin with an unsaturated carboxylic acid or acid anhydride thereof. The modified polyolefin resin modified with an unsaturated carboxylic acid or acid anhydride thereof and a (meth)acrylic acid ester is obtained by acid modifying a polyolefin resin using an unsaturated carboxylic acid or acid anhydride thereof in combination with a (meth)acrylic acid ester.

The polyolefin to be modified is not particularly limited as long as it is a resin containing at least an olefin as a monomer unit. The polyolefin resin can be formed from, for example, at least one of a polyethylene-based resin and a polypropylene-based resin, and is preferably formed from a polypropylene-based resin. The polyethylene-based resin can be formed from, for example, at least one of homo-polyethylene and an ethylene copolymer. The polypropylene-based resin can be formed from, for example, at least one of homo-polypropylene and a propylene copolymer. Examples of the propylene copolymer include copolymers of propylene and other olefins, such as ethylene-propylene copolymers, propylene-butene copolymers and ethylene-propylene-butene copolymers. The ratio of propylene units contained in the polypropylene-based resin is preferably about 50 mol % to 100 mol %, more preferably about 80 mol % to 100 mol % for further improving the insulation quality and durability of the battery packaging material. The ratio of ethylene units contained in the polyethylene-based resin is preferably about 50 mol % to 100 mol %, more preferably about 80 mol % to 100 mol % for further improving the insulation quality and durability of the battery packaging material. The ethylene copolymer and the propylene copolymer may each be either a random copolymer or a block copolymer. The ethylene copolymer and the propylene copolymer may each be either crystalline or noncrystalline, or may each be a copolymer or mixture of the crystalline and noncrystalline copolymers. The polyolefin resin may be formed of one homopolymer or copolymer, or may be formed of two or more homopolymers or copolymers.

As the unsaturated carboxylic acid and acid anhydride, those described above can be recited. The modified polypropylene-based resin may be modified with one unsaturated carboxylic acid or acid anhydride thereof, or may be modified with two or more unsaturated carboxylic acids or acid anhydrides thereof as is the case with the above.

The ratio of the unsaturated carboxylic acid or acid anhydride thereof in the modified polyolefin resin (B) having a melting point of greater than or equal to 110° C. is preferably about 0.1% by mass to 30% by mass, more preferably about 0.1% by mass to 20% by mass. When the ratio of the (meth)acrylic acid ester in the acid-modified polyolefin resin falls within the above-mentioned range, the insulation quality and durability of the battery packaging material can be improved.

The (meth)acrylic acid ester is, for example, an esterified product of (meth)acrylic acid and an alcohol with a carbon number of 1 to 30, preferably an esterified product of (meth)acrylic acid and an alcohol with a carbon number of 1 to 20. Specific examples of the (meth)acrylic acid ester include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth) acrylate, octyl (meth)acrylate, dodecyl (meth)acrylate and stearyl (meth)acrylate. The modified polypropylene-based resin may be modified with one (meth)acrylic acid ester, or may be modified with two or more (meth)acrylic acid esters.

In the case of modifying with a (meth)acrylic acid ester, the ratio of the (meth)acrylic acid ester in the modified polyolefin resin (B) having a melting point of greater than or equal to 110° C. is preferably about 0.1% by mass to 40% by mass, more preferably about 0.1% by mass to 30% by mass. When the ratio of the (meth)acrylic acid ester in the acid-modified polyolefin resin falls within the above-mentioned range, the insulation quality and durability of the battery packaging material can be improved.

The method for modifying a polyolefin resin is not particularly limited, and for example, a method of copolymerizing an unsaturated carboxylic acid or acid anhydride thereof and a (meth)acrylic acid ester with a polyolefin resin can be recited. Copolymerization in this case is random copolymerization, block copolymerization, graft copolymerization (graft modification) or the like, with graft copolymerization being preferred.

The ratio of the unsaturated carboxylic acid or acid anhydride thereof and the ratio of the (meth)acrylic acid ester in the polyolefin resin can be determined by $^1$H-NMR analysis.

When the modified polyolefin resin modified with an unsaturated carboxylic acid or acid anhydride thereof, and the modified polyolefin resin modified with an unsaturated carboxylic acid or acid anhydride thereof and a (meth) acrylic acid ester are used in combination, the ratio in the modified polyolefin resin (B) is preferably about 10:90 to 90:10, more preferably about 20:80 to 80:20 in terms of mass ratio.

The weight average molecular weight of the modified polyolefin resin (B) having a melting point of greater than or equal to 110° C. is preferably about 6000 to 200000, more preferably about 8000 to 150000. When the weight average molecular weight falls within the aforementioned range, it is possible to stabilize the affinity of the insulating layer 3 with the metal layer 2 and the sealant layer 4 when the later-described modified polyolefin resin (C) having a melting point of less than or equal to 100° C. is used in combination, and thus it is possible to stabilize adhesion between the metal layer 2 and the sealant layer 4 over a long period of time. Further, since heat resistance can be improved, the insulation quality and the durability of the battery packaging material can be further improved.

As the melting point of the modified polyolefin resin (B) having a melting point of greater than or equal to 110° C., preferably about 110 to 160° C., more preferably about 110 to 150° C. can be recited. The melting point can be adjusted by appropriately setting the weight average molecular weight of the modified polyolefin resin (B), the ratios of the unsaturated carboxylic acid or acid anhydride thereof and the (meth)acrylic acid ester and the like.

When the noncrystalline modified polyolefin resin (A), and the modified polyolefin resin (B) having a melting point of greater than or equal to 110° C. are used in combination, the ratio of the modified polyolefin resin (A) and the modified polyolefin resin (B) in the resin composition forming the insulating layer 3 is not particularly limited, and for example, it may be about 20:80 to 80:20, more preferably about 30:70 to 70:30 in terms of mass ratio.

While the modified polyolefin resin (C) having a melting point of less than or equal to 100° C. is not particularly limited, it is preferably at least one of a modified polyolefin resin modified with an unsaturated carboxylic acid or acid anhydride thereof, and a modified polyolefin resin modified with an unsaturated carboxylic acid or acid anhydride thereof and a (meth)acrylic acid ester as described above for the modified polyolefin resin (B) having a melting point of greater than or equal to 110° C. By using such a modified polyolefin resin as the modified polyolefin resin (C) having a melting point of less than or equal to 100° C., it is possible to further improve the insulation quality and the durability of the battery packaging material when it is used in combination with at least one of a noncrystalline modified polyolefin resin (A) and a modified polyolefin resin (B) having a melting point of greater than or equal to 110° C.

The ratio of the unsaturated carboxylic acid or acid anhydride thereof in the modified polyolefin resin (C) having a melting point of less than or equal to 100° C. is preferably about 0.1% by mass to 30% by mass, more preferably about 0.1% by mass to 20% by mass. When the ratio of the (meth)acrylic acid ester in the acid-modified polyolefin resin falls within the above-mentioned range, the insulation quality and durability of the battery packaging material can be improved.

In the case of modifying with a (meth)acrylic acid ester, the ratio of the (meth)acrylic acid ester in the modified polyolefin resin (C) having a melting point of less than or equal to 100° C. is preferably about 0.1% by mass to 40% by mass, more preferably about 0.1% by mass to 30% by mass. When the ratio of the (meth)acrylic acid ester in the acid-modified polyolefin resin falls within the above-mentioned range, the insulation quality and durability of the battery packaging material can be improved.

When the modified polyolefin resin modified with an unsaturated carboxylic acid or acid anhydride thereof, and the modified polyolefin resin modified with an unsaturated carboxylic acid or acid anhydride thereof and a (meth) acrylic acid ester are used in combination, the ratio in the modified polyolefin resin (C) having a melting point of less than or equal to 100° C. is preferably about 10:90 to 90:10, more preferably about 20:80 to 80:20 in terms of mass ratio.

The weight average molecular weight of the modified polyolefin resin (C) having a melting point of less than or equal to 100° C. is preferably about 6000 to 200000, more preferably about 8000 to 150000. When the weight average molecular weight falls within the aforementioned range, it is possible to stabilize the affinity of the insulating layer 3 with the metal layer 2 and the sealant layer 4 when at least one of the aforementioned noncrystalline modified polyolefin resin (A) and the modified polyolefin resin (B) having a melting point of greater than or equal to 110° C. is used in combination, and thus it is possible to stabilize adhesion between the metal layer 2 and the sealant layer 4 over a long period of time. Further, since heat resistance can be improved, the insulation quality and the durability of the battery packaging material can be further improved.

As the melting point of the modified polyolefin resin having a melting point of less than or equal to 100° C., preferably about 40 to 100° C., more preferably about 50 to 100° C. can be recited. The melting point can be adjusted by appropriately setting the weight average molecular weight of the modified polyolefin resin (C), the ratios of the unsaturated carboxylic acid or acid anhydride thereof and the (meth)acrylic acid ester and the like.

In the resin composition that forms the insulating layer 3, while the ratio between (i) at least one of a noncrystalline modified polyolefin resin (A) and a modified polyolefin resin (B) having a melting point of greater than or equal to 110° C., and (ii) a modified polyolefin resin (C) having a melting point of less than or equal to 100° C. is not particularly limited, it is preferably about 20:80 to 80:20, more preferably about 30:70 to 70:30 in terms of mass ratio. When the ratio falls within the aforementioned range, it is possible to further increase the effect of improving the insulation quality and the durability by using (i) at least one of a noncrystalline modified polyolefin resin (A) and a modified polyolefin resin (B) having a melting point of greater than or equal to 110° C., and (ii) a modified polyolefin resin (C) having a melting point of less than or equal to 100° C. in combination.

As described above, in the production process of batteries, very small contaminants such as debris of an electrode active material and an electrode tab may stick to the surface of the sealant layer, and accordingly thin parts and through-holes may be generated in the sealant layer, leading to deterioration of insulation quality of the battery packaging material. On the other hand, in the battery packaging material according to Exemplary embodiment C, since the insulating layer 3 is formed of a resin composition containing the modified polyolefin resins (i) and (ii) in combination, the battery packaging material has high heat resistance and mechanical strength at the time of application of heat during heat-sealing, and has high flexibility, so that generation of fine cracks due to stress associated with bending or the like can be prevented. Therefore, even when fine cracks that are easily generated at thin parts, through-holes that are generated by contaminants etc., voids resulting from foaming of the sealant layer which occurs in the case where the sealant layer 4 is heat-sealed while catching an electrolytic solution, or the like are formed in the sealant layer 4, the electrolytic solution can be prevented from coming into direct contact with the metal layer by the insulating layer 3, so that the metal layer 2 is protected. Even when the sealant layer 4 catches contaminants etc., deterioration of the insulation quality of the battery packaging material by contaminants can be prevented by the insulating layer 3 having high heat resistance and high mechanical strength and flexibility. Further, in Exemplary embodiment C, since the insulating layer 3 has high affinity with the metal layer 2 and the sealant layer 4, adhesion between the insulating layer 3 and the metal layer 2 or the sealant layer 4 is high, and excellent durability is realized.

In the resin composition, a content of the curing agent is preferably in a range of 0.1 part by mass to 50 parts by mass, more preferably in a range of 0.1 part by mass to 30 parts by mass based on a total of 100 parts by mass of (i) a noncrystalline modified polyolefin resin (A) and a modified polyolefin resin (B) having a melting point of greater than or equal to 110° C., and (ii) a modified polyolefin resin (C) having a melting point of less than or equal to 100° C. In the resin composition, a content of the curing agent is preferably in a range of 1 equivalent to 30 equivalents, more preferably in a range of 1 equivalent to 20 equivalents in terms of a reactive group in the curing agent based on 1 equivalent of all active carboxyl groups (the sum of hydroxyl groups of carboxyl group and end alcoholic hydroxyl groups) in the modified polypropylene-based resin. Accordingly, the insulation quality and durability of the battery packaging material can be improved.

[Sealant Layer 4]

In the battery packaging material of the present invention, the sealant layer 4 is a layer that forms the innermost layer of the battery packaging material of the present invention when a battery is assembled. In assembling a battery, the surfaces of the sealant layer 4 are brought into contact with each other, and the contact part is heat-welded, and thus the battery element can be hermetically sealed.

The resin component for forming the sealant layer 4 is not particularly limited as long as the sealant layers 4 can be heat-welded. Examples of the resin component include a polyolefin, a cyclic polyolefin, a carboxylic acid modified polyolefin, and a carboxylic acid modified cyclic polyolefin.

Specific examples of the polyolefin include polyethylene such as low-density polyethylene, medium-density polyethylene, high-density polyethylene and linear low-density polyethylene; crystalline or noncrystalline polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylene and polypropylene are preferred.

The cyclic polyolefin is a copolymer of an olefin and a cyclic monomer. Examples of the olefin include ethylene, propylene, 4-methyl-1-pentene, styrene, butadiene and isoprene. Examples of the cyclic monomer include cyclic alkenes such as norbornene, and cyclic dienes such as cyclopentadiene, dicyclopentadiene, cyclohexadiene and norbornadiene. Among these polyolefins, cyclic alkenes are preferred, and norbornene is further preferred.

The carboxylic acid modified polyolefin is a polymer obtained by modifying a polyolefin with a carboxylic acid. Examples of the carboxylic acid to be used for modification include maleic acid, acrylic acid, itaconic acid, crotonic acid, maleic anhydride and itaconic anhydride.

The carboxylic acid modified cyclic polyolefin is a polymer obtained by copolymerization while part of monomers constituting the cyclic polyolefin is replaced by $\alpha,\beta$-unsaturated carboxylic acid or acid anhydride thereof, or by block copolymerization or graft polymerization of $\alpha,\beta$-unsaturated carboxylic acid or acid anhydride thereof with the cyclic polyolefin. The cyclic polyolefin to be modified with a carboxylic acid can be similar to the aforementioned cyclic polyolefin. The carboxylic acid to be used for modification can be similar to that used in modification of the acid modified cycloolefin copolymer.

Among these resin components, crystalline or noncrystalline polyolefins, cyclic polyolefins, and blend polymers thereof are preferred, and polyethylene, polypropylene, copolymer of ethylene and norbornene, and blend polymer of two or more of these are more preferred.

The sealant layer 4 may be formed of only one resin component, or may be formed of a blend polymer consisting of a combination of two or more resin components. Further, the sealant layer 4 may be formed of only one layer, or of two or more layers of the same or different resin components.

From the view point of improving the sealing strength of the battery packaging material of the present invention, in the sealant layer 4, an elastic modulus, when measured by using a nanoindenter and pressing an indenter 5 μm into the sealant layer 4 from a cross-section of the laminate in the laminating direction thereof, ranges preferably from 100

MPa to 1000 MPa, more preferably from 100 MPa to 800 MPa. The elastic modulus of the sealant layer 4 is more concretely the elastic modulus determined by pressing an indenter made of a diamond chip having a tip end in the form of a triangular pyramid (Berkovich type) 5 μm into the sealant layer 4 from the cross-section of the laminate by using a nanoindenter, and measuring the elastic modulus when the indenter is pressed in. The elastic modulus is measured by a so-called nanoindentation method.

The thickness of the sealant layer 4 is not particularly limited, and for example, it may be about 2 μm to 2000 μm, preferably about 5 μm to 1000 μm, more preferably about 10 μm to 500 μm.

[Adhesive Layer 5]

In the battery packaging material of the present invention, the adhesive layer 5 may further be provided between the base material layer 1 and the metal layer 2 for ensuring rigid adhesion between the base material layer 1 and the metal layer 2.

The adhesive layer 5 is formed of an adhesive resin component capable of bonding the base material layer 1 and the metal layer 2. The adhesive resin used for forming the adhesive layer 5 may be a two-liquid curable adhesive resin, or may be a one-liquid curable adhesive resin. The adhesive mechanism of the adhesive component used in formation of the adhesive layer 5 is not particularly limited, and for example, a chemical reaction type, a solvent volatile type, a hot-melt type, and a hot-press type can be recited.

Specific examples of the adhesive component that can be used for forming the adhesive layer 5 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, carboxylic acid-modified polyolefins and metal-modified polyolefins, polyvinyl acetate-based resins; cellulose-based adhesives; (meth) acryl-based resins; polyimide-based resins; amino resins such as urea resins and melamine resins; rubbers such as chloroprene rubber, nitrile rubber and styrene-butadiene rubber; and silicone-based resins. These adhesive components may be used singly or two or more adhesive components may be used in combination.

While the thickness of the adhesive layer 5 is not particularly limited, it can be, for example, about 1 μm to 40 μm, preferably about 2 μm to 30 μm.

[Moisture Barrier Resin Layer 6]

In the battery packaging material of the present invention, by providing the moisture barrier resin layer 6 at least between the metal layer 2 and the insulating layer 3 or between the insulating layer 3 and the sealant layer 4, the moisture resistance of the battery packaging material can be further improved. That is, it is possible to prevent the moisture from permeating through the battery packaging material to deteriorate the electrolyte or the like more effectively.

The material constituting the moisture barrier resin layer 6 is not particularly limited as long as it can improve the moisture resistance of the battery packaging material. The moisture barrier resin layer 6 can be formed, for example, of a fluorine-based resin or the like. The moisture barrier resin layer 6 is preferably formed from a fluorine-containing copolymer with a hydroxyl group, and a curing agent that reacts with the fluorine-containing copolymer. As a result, it is possible to stabilize adhesion between the metal layer 2 and the insulating layer 3 and between the insulating layer 3 and the sealant layer 4 over a long period of time, and to improve the heat resistance, and hence, it is possible to improve the insulation quality and the durability of the battery packaging material.

The fluorine-containing copolymer with a hydroxyl group is not particularly limited, and for example, those soluble in an organic solvent, with an alcoholic hydroxyl group (OH group) as a cross-linking site in the molecule can be recited.

Examples of such a fluorine-containing copolymer include:
1) a fluoroolefin monomer represented by the formula: $CF_2=CFX$ (wherein, X represents a fluorine atom, a hydrogen atom, or a trifluoromethyl group),
2) a β-methyl substituted α-olefin monomer represented by the formula: $CH_2=CR(CH_2)$ (wherein, R represents an alkyl group with a carbon number of 1 to 8),
3) a hydroxyl group-containing monomer represented by the formula: $CH_2=CHR^1$ (wherein, $R^1$ is $-OR^2$ or $-CH_2OR^2$ (provided that $R^2$ is an alkyl group having a hydroxyl group)), and
4) a fluorine-containing copolymer not having a cross-linkable functional group, derived from other monomer capable of copolymerizing with the monomer 1), 2) or 3).

Examples of the fluoroolefin monomer include tetrafluoroethylene, trifluoroethylene, and hexafluoropropylene. Examples of the β-methyl substituted α-olefin monomer include isobutylene, 2-methyl-1-pentene, and 2-methyl-1-hexene. Examples of the hydroxyl group-containing monomer include 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 5-hydroxypentyl vinyl ether, 6-hydroxyhexyl vinyl ether, 2-hydroxyethyl allyl ether, and 4-hydroxybutyl allyl ether. The fluoroolefin monomers may be used singly or two or more fluoroolefin monomers may be used in combination.

Examples of other monomer capable of copolymerizing with the fluoroolefin monomer, the β-methyl substituted α-olefin monomer, or the hydroxyl group-containing monomer include carboxylic acid vinyl esters such as vinyl acetate, vinyl propionate, vinyl (iso)butyrate, vinyl caproate, vinyl laurate, vinyl stearate, vinyl benzoate, vinyl hexafluoropropionate, and vinyl trifluoroacetate; diesters of maleic acid or fumaric acid such as dimethyl maleate or fumarate, diethyl, dipropyl, dibutyl, ditrifluoromethyl, ditrifluoromethyl, dihexafluoropropyl; alkyl vinyl ethers such as methyl vinyl ether, ethyl vinyl ether, n-propyl vinyl ether, iso-butyl vinyl ether, tert-butyl vinyl ether; cycloalkyl vinyl ethers such as cyclopentyl vinyl ether, cyclohexyl vinyl ether; vinyl ethers having an aromatic group such as benzyl vinyl ether; or fluoroalkyl vinyl ethers such as perfluoroethyl vinyl ether, perfluoropropyl vinyl ether; and crotonic acid, vinylacetic acid, maleic acid, and styrene. The other monomer may be used singly or two or more other monomers may be used in combination.

The fluorine-containing copolymer having a hydroxyl group can be obtained, for example, by copolymerizing the monomers represented by the formulae 1) to 4) in a well known method such as emulsion polymerization, solution polymerization or suspension polymerization. As the fluorine-containing copolymer having a hydroxyl group, for example, those having a number average molecular weight, measured by GPC using polystyrene as a standard sample, of about 1,000 to 500,000, preferably about 3,000 to 100,000 are used.

As the curing agent, an organic polyisocyanate compound that is highly reactive with a hydroxyl group which is a cross-linking site is appropriate, and for example, 2,4-tolylene diisocyanate, diphenylmethane-4,4'-diisocyanate, xylylene diisocyanate, isophorone diisocyanate, lysine methylester diisocyanate, methylcyclohexyl diisocyanate, trimethylhexamethylene diisocyanate, hexamethylene diisocyanate, n-pentane-1,4-diisocyanate, and trimers thereof, adducts thereof, biurets thereof, polymers thereof having two or more isocyanate groups, and blocked isocyanates. The organic polyisocyanate compound may be used singly or two or more organic polyisocyanate compounds may be used in combination.

For example, by reacting such a fluorine-containing copolymer having a hydroxyl group with a curing agent, it is possible to form the moisture barrier resin layer 6 formed of a cured product of the fluorine-based adhesive. For example, it is appropriate to dissolve the fluorine-containing copolymer in a solvent, and add the curing agent so that it is more than or equal to 0.3 equivalent, preferably 0.5 to 2.0 equivalents, based on 1 equivalent of hydroxyl groups (—OH groups) in the fluorine-containing copolymer. When it is less than 0.3 equivalent, the laminate strength can be impaired, and when it is more than 2.0 equivalents, a large amount of unreacted isocyanate groups can remain to deteriorate the laminate strength.

While the thickness of the moisture barrier resin layer 6 is not particularly limited, it can be, for example, about 0.1 μm to 20 μm, preferably about 0.5 μm to 15 μm.

When the moisture barrier resin layer 6 is formed between the insulating layer 3 and the sealant layer 4, it is preferred that the thickness of the insulating layer 3 is smaller compared with the case where the insulating layer 3 and the sealant layer 4 are directly laminated, and for example, the thickness of the insulating layer 3 is preferably less than or equal to 1 μm. As a result, the stress applied on the moisture barrier resin layer 6 at the time of sealing can be scattered in the metal layer 2 and the insulating layer 3, so that it is possible to prevent cracking of the moisture barrier resin layer 6 and to further improve the moisture resistance of the battery packaging material.

3. Method for Producing Battery Packaging Material

While the method for producing a battery packaging material of the present invention is not particularly limited as long as a laminate in which layers each having a predetermined composition are laminated is obtained, for example, the following method can be exemplified.

At least the base material layer 1, the metal layer 2, the insulating layer 3, and the sealant layer 4 are laminated in this order to obtain a laminate. Specifically, at first, the base material layer 1 and the metal layer 2 are laminated. This lamination can be conducted, for example, by conducting a dry lamination method using the aforementioned adhesive component that forms the adhesive layer 5. As a method for laminating the base material layer 1 and the metal layer 2, a method of extruding a resin that forms the base material layer 1 on the metal layer 2, a method of vapor-depositing metal on the base material layer 1 to form the metal layer 2, and so on can be recited. Next, on the surface opposite to the base material layer 1 of the metal layer 2, the resin composition to be used for formation of the insulating layer 3 is applied, and dried. The resin composition can be applied by a coating method such as an extruding method, a gravure coating method or a roll coating method. Prior to laminating the base material layer 1, the metal layer 2, and the insulating layer 3, one or both surfaces of the metal that forms the metal layer 2 may be subjected to a chemical conversion treatment as described above. Next, the sealant layer 4 is laminated on the resin composition. This lamination can be conducted, for example, by a dry lamination method. In order to prevent the m permeability from the end face of the battery packaging material and improve the durability of the battery, on the surface of the metal layer 2, a component for forming the moisture barrier resin layer 6 may be applied and dried, and then a resin composition for forming the insulating layer 3 may be applied and dried, and then a sealant layer 4 may be formed thereon as is necessary.

For increasing adhesion of each layer in the obtained laminate, an aging treatment or the like may be conducted. The aging treatment can be conducted, for example, by heating the laminate at a temperature of about 30 to 100° C. for 1 to 200 hours. Further, for increasing adhesion of each layer in the obtained laminate, the obtained laminate may be heated at a temperature higher than the melting point of the sealant layer 4. The temperature at this time is preferably the melting point of the sealant layer 4 +5° C. or higher and the melting point +100° C. or lower, more preferably the melting point +10° C. or higher and the melting point +80° C. or lower. The aging treatment and the heating treatment at a temperature of the melting point of the sealant layer 4 or higher may be conducted alternatively or both of these treatments may be conducted. In the case of conducting both of these treatments, the order of the treatments is not particularly limited, however, by conducting the aging treatment after conducting the heating treatment at a temperature of the melting point of the sealant layer 4 or higher, the film strength of the insulating layer 3 increases, and the insulating layer 3 that is excellent in durability for a longer time is formed. In the case of conducting the aging treatment after conducting the heating treatment at a temperature of the melting point of the sealant layer 4 or higher, by setting the aging temperature at 80° C. or lower, crystal growth of the sealant layer 4 is prevented, and generation of a crack at the time of molding the battery packaging material is prevented, and the insulation quality against immersion of the electrolytic solution can be improved more effectively. In the present invention, the melting point of the sealant layer refers to an endothermic peak temperature of the resin component constituting the sealant layer in differential scanning calorimetry. Each of the heating in the aging treatment and the heating at a temperature of the melting point of the sealant layer 4 or higher can be conducted by a method such as a hot roll contact method, a hot-air method, a near or far infrared method, etc.

In the battery packaging material of the present invention, the layers that form the laminate may be subjected to a surface activation treatment such as a corona treatment, a blast treatment, an oxidation treatment or an ozone treatment as necessary for improving or stabilizing the film formability, the lamination processing and the final product secondary processing (pouching and embossing molding) suitability, and the like.

4. Use of Battery Packaging Material

The battery packaging material of the present invention is used as a package for hermetically sealing and accommodating a battery element such as a positive electrode, a negative electrode and an electrolyte. That is, the battery packaging material of the present invention can be a package that is deformed in accordance with the shape of a battery element to accommodate the battery element.

Specifically, a battery element having at least a positive electrode, a negative electrode and an electrolyte is covered with the battery packaging material of the present invention in such a manner that a flange part (the region where the sealant layers contact each other) can be formed on the periphery of the battery element in the condition that metal terminals connected respectively to the positive electrode and the negative electrode project outside. Next, the sealant layers of the flange part are hermetically sealed by heat sealing, and thus the battery that is hermetically sealed by the battery packaging material (package) is provided. When the battery element is accommodated using the battery packaging material of the present invention, the battery packaging material of the present invention is used such that the sealant layer 4 is on the inner side (surface in contact with the battery element).

While the battery packaging material of the present invention may be used for either a primary battery or a secondary battery, it is suited for use particularly in a secondary buttery. The type of secondary battery to which the battery packaging material of the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred objects to which the battery packaging material according to the present invention is applied include lithium ion batteries and lithium ion polymer batteries.

EXAMPLES

Hereinafter, the present invention will be described in detail below by showing Examples and Comparative Examples. It is to be noted that the present invention is not limited to Examples.

Examples 1 to 5 and Comparative Examples 1 to 2

As aluminum foil that forms a metal layer, aluminum foil (thickness 40 µm) of soft aluminum (JIS H4160 A8021H-O) whose both surfaces are subject to a chemical conversion treatment was used. The chemical conversion treatment on the aluminum foil was conducted by applying a treatment solution composed of a phenol resin, a chromium fluoride compound, and phosphoric acid on both surfaces of the metal layer by a roll coating method to form a film, and baking the film for 20 seconds under the condition that the film temperature was 180° C. or higher. Next, for forming an adhesive layer on one of the surfaces of the aluminum foil subjected to the chemical conversion treatment, an adhesive containing a polyester-polyol resin as a base and a TMP adduct type TDI-based curing agent as a curing agent was applied so that the thickness was 4 µm and dried. Next, on the adhesive, 20 µm of a biaxial oriented nylon film which is to be a base material layer was pasted together by a dry lamination method, to obtain a laminate in which the base material layer, the adhesive layer, and the metal layer were laminated. Further, for forming an insulating layer on the other of the surfaces of the aluminum foil of the laminate, a resin composition obtained by mixing a modified polyolefin resin (maleic anhydride modified ethylene-propylene copolymer, weight average molecular weight: 100000, melting point: 100° C., ethylene content in the polypropylene main backbone: 2.1 mol %, maleic anhydride-modified degree: 3.0% by mass) and a curing agent (prepolymer type diphenylmethane diisocyanate, content of NCO: 31% by mass) was applied so that the thickness was 5 µm and dried. A content of the curing agent was 1 equivalent in Example 1, 5 equivalents in Example 2, 10 equivalents in Example 3, 20 equivalents in Example 4, 30 equivalents in Example 5, 0.0 equivalent in Comparative Example 1, and 50 equivalents in Comparative Example 2 in terms of a reactive group in the curing agent based on 1 equivalent of carboxyl groups in the modified polypropylene-based resin.

Next, on the dried resin composition, a non-oriented polypropylene film (ethylene-propylene random copolymerized type, thickness: 30 µm, melting point: 140° C.) for forming a sealant layer was laminated, and the layers were bonded by a dry lamination method to obtain a laminate. The obtained laminate was aged for 24 hours under the temperature of 80° C., and finally heated for 2 minutes at 190° C. to obtain a battery packaging material including the base material layer, the adhesive layer, the metal layer, the insulating layer, and the sealant layer laminated in this order.

Example 6

A battery packaging material was produced in the same manner as in Example 4 except that after applying an insulating layer on the metal layer so that the thickness was 0.1 µm followed by drying, a fluorine-based resin solution containing fluoroolefin-hydroxyl group-containing vinyl ether copolymer as a fluorine-containing copolymer, and a trimer of hexamethylene diisocyanate which is an isocyanate-based curing agent added in an amount of 1.1 equivalents based on 1 equivalent of hydroxyl groups (—OH groups) of polyol as a curing agent was applied and dried so that the it was 3.0 g/m² after drying to form a fluorine-based resin layer, and a non-oriented polypropylene film (ethylene-propylene random copolymerized type, thickness: 30 µm, melting point: 140° C.) was pressure-bonded by heating to form a sealant layer.

Example 7

A battery packaging material was produced in the same manner as in Example 2 except that on the metal layer, a resin composition obtained by mixing a modified polyolefin resin (modified ethylene-propylene copolymer, weight average molecular weight: 110000, melting point: 120° C., content of ethylene in the polypropylene main backbone: 2.5 mol %, maleic anhydride-modified degree: 8.0% by mass, ethyl acrylate-modified degree: 1.0% by mass) and a curing agent (prepolymer type diphenylmethane diisocyanate, content of NCO: 31% by mass) was applied so that the thickness was 5 µm to form an insulating layer.

Example 8

A battery packaging material was produced in the same manner as in Example 2 except that on the metal layer, a resin composition obtained by mixing a modified polyolefin resin (modified ethylene-propylene copolymer, weight average molecular weight: 130000, melting point: 75° C., content of ethylene in the polypropylene main backbone: 2.3 mol %, maleic anhydride-modified degree: 5.0% by mass, octyl acrylate-modified degree: 5.0% by mass) and a curing agent (prepolymer type diphenylmethane diisocyanate, content of NCO: 31% by mass) was applied so that the thickness was 5 µm to form an insulating layer.

Example 9

A battery packaging material was produced in the same manner as in Example 2 except that on the metal layer, a resin composition obtained by mixing a modified polyolefin resin (modified ethylene-propylene copolymer, weight average molecular weight: 110000, melting point: 80° C., content of ethylene in the polypropylene main backbone: 2.1 mol %, itaconic anhydride-modified degree: 4.0% by mass, ethyl acrylate-modified degree: 3.0% by mass) and a curing agent (prepolymer type diphenylmethane diisocyanate, content of NCO: 31% by mass) was applied so that the thickness was 5 μm to form an insulating layer.

Example 10

A battery packaging material was produced in the same manner as in Example 2 except that on the metal layer, a resin composition obtained by mixing a modified polyolefin resin (maleic anhydride modified ethylene-propylene copolymer, weight average molecular weight: 100000, melting point: 90° C., content of ethylene in the polypropylene main backbone: 1.9 mol %, maleic anhydride-modified degree: 18.0% by mass) and a curing agent (prepolymer type diphenylmethane diisocyanate, content of NCO: 31% by mass) was applied so that the thickness was 5 μm to form an insulating layer.

Example 11

A battery packaging material was produced in the same manner as in Example 2 except that on the metal layer, a resin composition obtained by mixing a modified polyolefin resin (maleic anhydride modified polyethylene, weight average molecular weight: 90000, melting point: 90° C., maleic anhydride-modified degree: 2.5% by mass) and a curing agent (prepolymer type diphenylmethane diisocyanate, content of NCO: 31% by mass) was applied so that the thickness was 5 μm to form an insulating layer.

<Measurement of Hardness of Insulating Layer by Indentation Method>

A nanoindenter (TriboIndenter TI950 available from HYSITRON) was used to measure the hardness of an insulating layer. In the nanoindenter, an indenter made of a diamond chip having a tip end in the form of a triangular pyramid (Berkovich type) (TI-0037 Cube Corner 90° Total included angle, model specification: AA11041012, available from HYSITRON) was used. The battery packaging material obtained in each of Examples 1 to 5 and Comparative Examples 1 to 2 was cut in the laminating direction to expose a cross-section of the insulating layer. Next, the hardness when the indenter was pressed 5 μm in the direction perpendicular to the cross-section of the insulating layer was measured by using the nanoindenter. The results are shown in Table 1.

<Evaluation of Durability>

The battery packaging material obtained in each of Examples 1 to 11 and Comparative Examples 1 to 2 was cut to a size of 60 mm (MD direction, longitudinal direction)× 150 mm (TD direction, lateral direction). Next, the cut battery packaging material was folded in half with the sealant layers facing each other in the TD direction, and heat-welded on one side with the sealant layers facing each other in the TD direction and on one of the sides in the MD direction to prepare a bag-shaped battery packaging material opened at one side in the TD direction. As conditions for heat-welding, the temperature was 190° C., the surface pressure was 1.0 MPa, and the heating and pressurization time was 3 seconds. Next, 3 g of an electrolytic solution was injected from the opening, and the opening was heat-welded to a width of 7 mm under the same conditions as described above. The electrolytic solution was obtained by mixing lithium phosphate hexafluoride with a solution formed by mixing ethylene carbonate, diethylene carbonate and dimethyl carbonate at a volume ratio of 1:1:1. Next, the battery packaging material was left standing in a thermostatic bath at 85° C. for 24 hours while a part of the battery packaging material where the opening was situated faced upward.

Next, each battery packaging material was taken out from the thermostatic bath, and the battery packaging material was unsealed to remove the electrolytic solution. Next, the folded part of the battery packaging material was cut to a strip with a width of 15 mm to obtain a test piece. The sealant layer and the metal layer of the obtained test piece were drawn at a speed of 50 mm/minute using a tensile tester (AGS-50D (trade name) manufactured by Shimadzu Corporation), and the peeling strength (N/15 mm) of the test piece was measured (tensile strength after durability test). On the other hand, for a test piece obtained by cutting the battery packaging material obtained in each of Examples 1 to 11 and Comparative Examples 1 to 2 to a width of 15 mm, the peeling strength was measured (tensile strength before durability test) in the same manner as described above. The results are shown in Table 1.

<Evaluation of Insulation Quality to Caught Contaminants)

The battery packaging material obtained in each of Examples 1 to 11 and Comparative Examples 1 to 2 was cut to a size of 40 mm (width)×100 mm (length) to obtain a test piece. Next, the test piece was folded with the short sides facing each other, and disposed in such a manner that the surfaces of the sealant layers of the test piece faced each other. Next, a wire of 25 μmφ was inserted between the mutually facing surfaces of the sealant layers. Next, in this state, the sealant layers were heat-sealed with each other in a direction orthogonal to the length direction of the battery packaging material using a heat sealer including a flat heat plate having a width of 7 mm on both upper and lower sides (heat sealing conditions: 190° C., 1.0 MPa). Next, a terminal of a tester was connected to each of the surfaces of base material layer on both sides in such a manner that a part of the battery packaging material where the wire was inserted was situated at the center. Next, a voltage of 100 V was applied between the testers, and a time (seconds) until a short circuit occurred was measured. The results are shown in Table 1.

<Evaluation of Insulation Quality to Cracks>

The battery packaging material obtained in each of Examples 1 to 11 and Comparative Examples 1 to 2 was cut to a sheet piece of 60 mm (MD direction)×60 mm (TD direction, lateral direction). Next, the sheet piece was folded in half in the MD direction (longitudinal direction), and heat-sealed at opposite sides to a width of 7 mm to prepare a pouch-type outer packaging having an opening at one side. Next, a lithium ion battery body including a cell was enclosed in the obtained outer packaging from the opened side in such a manner that a metal terminal was drawn to outside, an electrolytic solution was put in the outer packaging, and the opening was hermetically sealed to a width of 3 mm while the metal terminal was sandwiched, thereby preparing a lithium ion battery. As conditions for performing heat-sealing at this time, the surface pressure was 2.0 MPa, the sealing temperature was 170° C., and the sealing time was 5.0 seconds. Next, a test for evaluation of insulation quality to cracks was then conducted using an impulse application system (lithium ion battery insulation tester manufactured by Nippon Technart Inc.). First, 100 each of the aforementioned lithium ion batteries were prepared, and an impulse voltage at an application voltage of 100 V was applied between the negative electrode terminal and the aluminum foil of each lithium ion battery, and the one showing a voltage drop after 99 msec within 20V was determined as acceptable, and the set of batteries showing a percentage of acceptable products of 20% or higher was indicated by ○. The set of batteries showing a percentage of acceptable products of less than 20% was indicated by ×. The results are shown in Table 1.

<Evaluation of Moisture Resistance>

The battery packaging material obtained in each of Examples 1 to 11 and Comparative Examples 1 to 2 was cut to a strip piece of 100 mm×100 mm. The obtained strip piece was folded double in the center, and one of the short side parts was heat-sealed with a width of 10 mm, and the long side part was heat-sealed with a width of 3 mm to produce a bag body whose the other of the short side parts was open. The heat sealing condition of the short side part was 190° C., 2.0 MPa, 3.0 seconds, and the heat sealing condition of the long side part was 190° C., 1.0 MPa, 3.0 seconds. Next, in a dry room (dew-point temperature: −50° C.), 3 g of a solution (ethylene carbonate/diethyl carbonate/dimethyl carbonate=1/1/1 (volume ratio)) was injected into the bag body, and the open part was heat-sealed with a width of 10 mm to produce each sample. Each obtained sample was stored in a thermo-hygrostat at 60° C., 90% RH for 168 hours, and then the solution in each sample was removed, and the increment in moisture (ppm) inside the sample was measured. The increment in moisture was measured by a Karl-Fischer method. The results are shown in Table 1.

the clack deteriorated. While the peeling strength was substantially unchanged before and after exposure to the electrolytic solution in the battery packaging materials of Examples 1 to 11, the peeling strength largely deteriorated in the battery packaging material of Comparative Example 1. Further, in Example 2, the peeling strength deteriorated because the metal layer and the sealant layer were delaminated while the insulating layer was cracking during the delamination test because the insulating layer became harder. This result revealed that the battery packaging materials of Examples 1 to 11 are excellent in durability and peeling strength in comparison with those of Comparative Examples 1 to 2. It was also revealed that the battery packaging material of Example 6 provided with the moisture barrier resin layer shows less increment in moisture and thus is excellent in moisture resistance in comparison with the battery packaging materials of Examples 1 to 5, Examples 7 to 11 and Comparative Examples 1 to 2 that are not provided with a moisture barrier resin layer.

Example 12

A laminate in which a base material layer, an adhesive layer, a metal layer, and an insulating layer are laminated was produced in the same manner as in Example 2. Next, the obtained laminate was subjected to an aging treatment at 80° C. for 24 hours, and then a sealant layer (ethylene-propylene random copolymerized type polypropylene-based resin, melting point: 140° C., MFR: 30, thickness: 30 μm) was

TABLE 1

| | | Evaluation of durability | | Evaluation of insulation quality to caught contaminants | | Moisture |
|---|---|---|---|---|---|---|
| | Hardness (MPa) | Peeling strength before durability test (N/15 mm) | Peeling strength after durability test (N/15 mm) | Time until short-circuit occurred (second) | Evaluation of insulation quality to cracks | resistance test Increment in moisture (ppm) |
| Example 1 | 15 | 9.1 | 9.0 | 22 | ○ | 32 |
| Example 2 | 37 | 9.4 | 9.3 | 32 | ○ | 41 |
| Example 3 | 87 | 8.7 | 8.0 | 39 | ○ | 43 |
| Example 4 | 160 | 8.8 | 8.4 | 40 | ○ | 50 |
| Example 5 | 240 | 7.5 | 7.4 | 50 | ○ | 55 |
| Example 6 | 155 | 8.3 | 8.0 | 31 | ○ | 21 |
| Example 7 | 38 | 10.3 | 10.0 | 32 | ○ | 49 |
| Example 8 | 27 | 10.1 | 9.8 | 28 | ○ | 45 |
| Example 9 | 28 | 9.9 | 8.9 | 29 | ○ | 42 |
| Example 10 | 66 | 8.8 | 8.0 | 37 | ○ | 52 |
| Example 11 | 18 | 8.8 | 8.2 | 22 | ○ | 33 |
| Comparative Example 1 | 8 | 7.5 | 2.1 | 4 | ○ | 30 |
| Comparative Example 2 | 320 | 5.4 | 5.0 | 41 | X | 68 |

It was revealed that the battery packaging materials in Examples 1 to 11 having a hardness, measured by pressing an indenter 5 μm into the insulating layer from the cross-section in the laminating direction of the laminate by using a nanoindenter, ranging from 10 MPa to 300 MPa show longer time until a short circuit occurred when contaminants are caught, and have higher insulation quality in comparison with the battery packaging material of Comparative Example 1 having a hardness of less than 10 MPa. In contrast, in Comparative Example 2, the hardness measured by using an indenter exceeded 300 MPa, and the insulating layer was harder, so that a crack occurred during production of the lithium ion battery, and the insulation quality against formed by an extrusion method. Next, the obtained laminate was heated at 190° C. for 2 minutes to obtain a battery packaging material of Example 12 including a base material layer, an adhesive layer, a metal layer, an insulating layer and a sealant layer laminated in this order.

Example 13

A battery packaging material of Example 13 was produced in the same manner as in Example 2 except that for a sealant layer, an ethylene-propylene terpolymer copolymerized type polypropylene-based resin (melting point: 137° C., MFR: 7, thickness: 30 μm) was used.

Example 14

A battery packaging material of Example 14 was produced in the same manner as in Example 2 except that for a sealant layer, an ethylene-propylene block copolymerized type polypropylene-based resin (melting point: 163° C., MFR: 7, thickness: 30 μm) was used.

Example 15

A battery packaging material of Example 15 was produced in the same manner as in Example 2 except that for a sealant layer, an ethylene-propylene random copolymerized type polypropylene-based resin (melting point: 140° C., MFR: 7.5, thickness: 30 μm) was used.

Example 16

A battery packaging material of Example 14 was produced in the same manner as in Example 2 except that for a sealant layer, an ethylene-propylene random copolymerized type polypropylene-based resin (melting point: 160° C., MFR: 5, thickness 15 μm) and an ethylene-propylene terpolymer copolymerized type polypropylene-based resin (melting point: 137° C., MFR: 7, thickness: 15 μm) that were co-extruded were used.

Comparative Example 3

A battery packaging material of Comparative Example 3 was produced in the same manner as in Example 2 except that for a sealant layer, an ethylene-propylene random copolymerized type polypropylene-based resin (melting point: 148° C., MFR: 9.5, thickness: 30 μm) was used.

<Measurement of Elastic Modulus of Sealant Layer by Indentation Method>

The aforementioned nanoindenter (TriboIndenter TI950 available from HYSITRON) was used to measure the elastic modulus of the sealant layer of the battery packaging material obtained in each of Examples 2, 12 to 16, and Comparative Example 3. In the nanoindenter, an indenter made of a diamond chip having a tip end in the form of a triangular pyramid (Berkovich type) (TI-0037 Cube Corner 90° Total included angle, model specification: AA11041012, available from HYSITRON) was used. The battery packaging material was cut in the laminating direction to expose a cross-section of the insulating layer. Next, the hardness when the indenter was pressed 5 μm in the direction perpendicular to the cross-section of the sealant layer was measured by using the nanoindenter. The results are shown in Table 2.

<Measurement of Sealing Strength>

The battery packaging material obtained in each of Examples 2, 12 to 16, and Comparative Example 3 was cut to a strip piece of 60 mm (MD direction)×120 mm (TD direction, lateral direction). Each strip piece was folded double in the TD direction, and the opposite two sides were heat-sealed with a width of 7 mm to form a bag having an opening on one end. Next, the opening of the obtained bag was heat-sealed in a width of 7 mm at a sealing temperature of 190° C., a surface pressure of 1.0 MPa, and a sealing time of 3.0 seconds. Next, the heat sealed part in the opening was cut into a strip of 15 mm wide, and the strip was drawn at a speed of 300 mm/minute using a tensile tester (AGS-50D (trade name) manufactured by Shimadzu Corporation), and the sealing strength (N/15 mm) was measured. The unit is N/15 mm wide. The results are shown in Table 2.

TABLE 2

| | Elastic modulus (MPa) | Sealing strength (N/15 mm) |
|---|---|---|
| Example 2 | 616 | 95 |
| Example 12 | 311 | 93 |
| Example 13 | 573 | 87 |
| Example 14 | 980 | 72 |
| Example 15 | 712 | 80 |
| Example 16 | 292 | 91 |
| Comparative Example 3 | 1200 | 29 |

As shown in Table 2, in the sealant layer, in the battery packaging materials of Example 2 and Examples 12 to 16 having an elastic modulus, measured by pressing an indenter 5 μm into the sealant layer from the cross-section in the laminating direction of the laminate by using a nanoindenter, ranging from 100 MPa to 1000 MPa, the sealing strength was very high in comparison with the battery packaging material of Comparative Example 3 having an elastic modulus of 1200 MP.

Example 17

A battery packaging material was obtained in the same manner as in Example 12 except that the aging treatment was not conducted.

Example 18

A laminate was obtained in the same manner as in Example 2 before conducting the aging treatment. Next, by heating the obtained laminate at 190° C. for 2 minutes, a battery packaging material was obtained.

Example 19

A laminate was obtained in the same manner as in Example 2 before conducting the aging treatment. Next, after heating the obtained laminate at 190° C. for 2 minutes, aging at 80° C. was conducted for 24 hours to obtain a battery packaging material.

Examples 1A to 13A and Comparative Examples 1A to 11A

A laminate including a base material layer, an adhesive layer and a metal layer laminated was obtained in the same manner as in Examples 1 to 5 and Comparative Examples 1 to 2. Next, for forming an insulating layer on the other of the surfaces of the aluminum foil of the laminate, a resin composition containing a modified polyolefin resin and a curing agent having the composition as shown in Table 1A was applied so that the thickness was 5 μm and dried. The modified percentage of modified polyolefin was determined by $^1$H-NMR analysis (available from Valian, 300 MHz). Next, on the dried resin composition, a non-oriented polypropylene film (ethylene-propylene random copolymerized type, melting point: 140° C., thickness: 30 μm) for forming a sealant layer was laminated, and the layers were bonded by a dry lamination method to obtain a laminate. The obtained laminate was aged for 24 hours under the temperature of 80° C., and further heated for 2 minutes at 190° C. to obtain a battery packaging material of each of Examples 1A to 13A and Comparative Examples 1A to 11A including the base material layer, the adhesive layer, the metal layer, the insulating layer, and the sealant layer laminated in this order.

Regarding Example 14A, the sample was produced in the same manner as in Example 4A except that the insulating layer 3 was applied to the metal layer 2 so that its thickness was 0.2 μm.

Regarding Example 15A, the sample was produced in the same manner as in Example 4A except that the insulating layer 3 was applied to the metal layer 2 so that its thickness was 15 μm.

<Evaluation of Durability>

For the battery packaging material in each of Examples 1A to 15A and Comparative Examples 1A to 11A, the durability was evaluated in the same manner as in Examples 1 to 11 and Comparative Examples 1 to 2. The results are shown in Table 1A.

<Evaluation of Insulation Quality to Caught Contaminants)

For the battery packaging material obtained in each of Examples 1A to 15A and Comparative Examples 1A to 11A, insulation quality against caught contaminants was evaluated in the same manner as in Examples 1 to 11 and Comparative Examples 1 to 2. The results are shown in Table 1A.

TABLE 1A

| | Modified polyolefin-based resin | | | | | | | | | Modified polypropylene/ curing agent (mass ratio) | Evaluation of durability | | Evaluation of insulation quality |
|---|---|---|---|---|---|---|---|---|---|---|---|---|---|
| | Molecular weight (weight average) | Melting point (°C.) | Polyolefin-based resin | Ratio of ethylene/butene in polypropylene skeleton (mol %) | Ratio of maleic anhydride (% by mass) | Ratio of acrylic acid ester (% by mass) | Carbon number in acrylic acid ester | Curing agent | | Peeling strength before durability test (N/15 mm) | Peeling strength after durability test (N/15 mm) | Time until short circuit occurred (second) |
| Example 1A | 130000 | 75 | Ethylene-propylene | 2.3 | 5 | 5 | 8 | IPDI | 10/1 | 8.5 | 8.3 | 28 |
| Example 2A | 130000 | 75 | Ethylene-propylene | 2.3 | 5 | 5 | 8 | HDI | 10/1 | 9.4 | 9.0 | 26 |
| Example 3A | 130000 | 75 | Ethylene-propylene | 2.3 | 5 | 5 | 8 | TDI | 10/1 | 12.0 | 12.0 | 32 |
| Example 4A | 130000 | 75 | Ethylene-propylene | 2.3 | 5 | 5 | 8 | MDI | 10/1 | 9.6 | 9.5 | 27 |
| Example 5A | 130000 | 75 | Ethylene-propylene | 2.3 | 5 | 5 | 8 | Carbodiimide | 10/0.05 | 7.8 | 7.6 | 31 |
| Example 6A | 130000 | 75 | Ethylene-propylene | 2.3 | 5 | 5 | 8 | Epoxy resin | 10/1 | 10.0 | 10.0 | 35 |
| Example 7A | 80000 | 70 | Ethylene-propylene | 2.5 | 5 | 9 | 8 | Oxazoline | 10/1 | 8.2 | 8.4 | 22 |
| Example 8A | 100000 | 60 | Ethylene-propylene-butene | 4/8 | 6 | 13 | 10 | MDI | 10/1 | 7.6 | 7.5 | 34 |
| Example 9A | 130000 | 140 | Propylene | 0 | 5 | 24 | 4 | MDI | 10/1 | 8.3 | 8.4 | 40 |
| Example 10A | 130000 | 75 | Ethylene-propylene | 2.3 | 5 | 5 | 8 | MDI | 10/0.5 | 7.4 | 7.3 | 22 |
| Example 11A | 130000 | 75 | Ethylene-propylene | 2.3 | 5 | 5 | 8 | MDI | 10/3 | 7.5 | 7.6 | 35 |
| Example 12A | 110000 | 120 | Ethylene-propylene | 2.5 | 8 | 1 | 2 | MDI | 10/1 | 9.2 | 8.0 | 24 |
| Example 13A | 150000 | 90 | Ethylene-propylene | 1.9 | 15 | 18 | 16 | MDI | 10/1 | 8.3 | 7.9 | 26 |
| Example 14A | 130000 | 75 | Ethylene-propylene | 2.3 | 5 | 5 | 8 | MDI | 10/1 | 8.3 | 8.0 | 21 |
| Example 15A | 130000 | 75 | Ethylene-propylene | 2.3 | 5 | 5 | 8 | MDI | 10/1 | 8.3 | 8.0 | 55 |
| Comparative Example 1A | 70000 | 100 | Ethylene-propylene | 2.0 | 3 | 0 | 8 | IPDI | 10/1 | 8.3 | 2.1 | 24 |
| Comparative Example 2A | 70000 | 100 | Ethylene-propylene | 2.0 | 3 | 0 | 8 | HDI | 10/1 | 7.6 | 7.5 | 8 |
| Comparative Example 3A | 70000 | 100 | Ethylene-propylene | 2.0 | 3 | 0 | 8 | TDI | 10/1 | 11.0 | 2.0 | 7 |
| Comparative Example 4A | 70000 | 100 | Ethylene-propylene | 2.0 | 3 | 0 | 8 | MDI | 10/1 | 9.1 | 9.0 | 12 |
| Comparative Example 5A | 70000 | 100 | Ethylene-propylene | 2.0 | 3 | 0 | 8 | Carbodiimide | 10/0.05 | 9.2 | 3.2 | 27 |
| Comparative Example 6A | 70000 | 100 | Ethylene-propylene | 2.0 | 3 | 0 | 8 | Epoxy resin | 10/1 | 9.7 | 1.2 | 7 |
| Comparative Example 7A | 60000 | 80 | Ethylene-propylene | 2.1 | 4 | 0 | 8 | Oxazoline | 10/1 | 8.9 | 2.3 | 4 |
| Comparative Example 8A | 50000 | 100 | Ethylene | — | 2 | 3 | 8 | MDI | 10/1 | 9.4 | 5.0 | 3 |
| Comparative Example 9A | 50000 | 100 | Ethylene | — | 2 | 3 | 8 | Carbodiimide | 10/0.05 | 8.5 | 2.2 | 8 |
| Comparative Example 10A | 50000 | 100 | Ethylene | — | 2 | 3 | 8 | Epoxy resin | 10/1 | 9.0 | 3.3 | 7 |
| Comparative Example 11A | 50000 | 100 | Ethylene | — | 2 | 3 | 8 | Oxazoline | 10/1 | 8.9 | 1.2 | 4 |

IPDI used as a curing agent is isophorone diisocyanate (nurate type, content of NCO: 17% by mass), HDI is hexamethylene diisocyanate (nurate type, content of NCO: 21% by mass), TDI is tolylene diisocyanate (TMP adduct type, content of NCO: 17% by mass), MDI is diphenylmethane diisocyanate (prepolymer type, content of NCO: 31% by mass), carbodiimide is Carbodilite V-05 (available from Nisshinbo Chemical Inc.), epoxy resin is jER828 (available from Mitsubishi Chemical Corporation), and oxazoline is Epocros WS-500 (available from Nippon Shokubai Co., Ltd.).

It was revealed that the battery packaging materials of Examples 1A to 15A having an insulating layer formed of a modified polypropylene-based resin obtained by modifying a polypropylene-based resin with maleic anhydride and an acrylic acid ester show a longer time until a short circuit occurred in the case of catching contaminants and higher insulation quality in comparison with the battery packaging materials of Comparative Examples 1A to 7A having an insulating layer formed of a modified polypropylene-based resin obtained by modifying a polypropylene-based resin only with maleic anhydride. It was also revealed that a longer time until a short circuit occurred in the case of catching contaminants and higher insulation quality are shown as is the case with the above in comparison with Comparative Examples 8A to 11A using a modified polyethylene resin obtained by modifying a polyethylene resin which is to be a main backbone (ethylene homopolymer) with maleic anhydride and an acrylic acid ester. In contrast to the battery packaging materials of Examples 1A to 15A that show substantially the same peeling strength before and after exposure to the electrolytic solution of the battery element, the battery packaging materials of Comparative Examples 1A to 11A showed large deterioration in the peeling strength. This result reveals that the battery packaging materials of Examples 1A to 15A are also excellent in durability.

Examples 1B to 7B and Comparative Examples 1B to 2B

A laminate including a base material layer, an adhesive layer and a metal layer laminated was obtained in the same manner as in Examples 1 to 5 and Comparative Examples 1 to 2. Next, for forming an insulating layer on the other of the surfaces of the aluminum foil, a resin composition was prepared by mixing a modified polyolefin resin (modified ethylene-propylene copolymer, weight average molecular weight: 80000, melting point: 95° C., content of ethylene in the polypropylene main backbone: 2.3 mol %, maleic anhydride-modified degree: 3.0% by mass), a carbodiimide compound (weight average molecular weight: 2000, carbodiimide equivalent: 200) and a polyfunctional isocyanate compound (prepolymer type diphenylmethane diisocyanate, NCO content: 31%) to have a respective composition shown in Table 1A, and the resin composition was applied so that the thickness was 5 μm and dried. Next, on the dried resin composition, a non-oriented polypropylene film (ethylene-propylene random copolymerized type, thickness: 30 μm) for forming a sealant layer was laminated, and the layers were bonded by a dry lamination method to obtain a laminate. The obtained laminate was aged for 24 hours under the temperature of 80° C., and further heated for 2 minutes at 190° C. to obtain a battery packaging material of each of Examples 1B to 7B and Comparative Examples 1B to 2B including the base material layer, the adhesive layer, the metal layer, the insulating layer, and the sealant layer laminated in this order.

Example 8B

A battery packaging material was produced in the same manner as in Examples 1B to 7B except that the insulating layer 3 was formed by using an epoxy compound (jER828, available from Mitsubishi Chemical Corporation) as the other curing agent in place of the polyfunctional isocyanate compound.

Example 9B

A battery packaging material was produced in the same manner as in Examples 1B to 7B except that on the metal layer, a resin composition obtained by mixing a modified polyolefin resin (modified ethylene-propylene copolymer, weight average molecular weight: 80000, melting point: 70° C., content of ethylene in the polypropylene main backbone: 2.5 mol %, maleic anhydride-modified degree: 9.0% by mass, octyl acrylate-modified degree: 7.0% by mass), a carbodiimide compound (weight average molecular weight: 1800, carbodiimide equivalent: 470) and an oxazoline compound (Epocros WS-500, available from Nippon Shokubai Co., Ltd.) was applied so that the thickness was 5 μm to form an insulating layer.

Example 10B

A battery packaging material was produced in the same manner as in Examples 1B to 7B except that on the metal layer, a resin composition obtained by mixing a modified polyolefin resin (modified ethylene-propylene copolymer, weight average molecular weight: 110000, melting point: 110° C., content of ethylene in the polypropylene main backbone: 2.1 mol %, maleic anhydride-modified degree: 5.0% by mass, octyl acrylate-modified degree: 7.0% by mass), a carbodiimide compound (weight average molecular weight: 2000, carbodiimide equivalent: 200), and a polyfunctional isocyanate compound (prepolymer type diphenylmethane diisocyanate, content of NCO: 31% by mass) was applied so that the thickness was 5 μm to form an insulating layer.

Example 11B

A battery packaging material was produced in the same manner as in Examples 1B to 7B except that on the metal layer, a resin composition obtained by mixing a modified polyolefin resin (maleic anhydride modified polyethylene, weight average molecular weight: 90000, melting point: 90° C., maleic anhydride-modified degree 8.0% by mass) and a carbodiimide compound (weight average molecular weight 2000, carbodiimide equivalent: 200) polyfunctional isocyanate compound (prepolymer type diphenylmethane diisocyanate, content of NCO: 31% by mass) was applied so that the thickness was 5 μm to form an insulating layer.

<Evaluation of Insulation Quality to Caught Contaminants)

For the battery packaging material obtained in each of Examples 1B to 11B and Comparative Examples 1B to 2B, insulation quality against caught contaminants was evaluated in the same manner as in Examples 1 to 11 and Comparative Examples 1 to 2. The results are shown in Table 1B.

<Evaluation of Durability>

For the battery packaging material in each of Examples 1A to 11B and Comparative Examples 1B to 2B, the durability was evaluated in the same manner as in Examples 1 to 11 and Comparative Examples 1 to 2. The results are shown in Table 1B.

TABLE 1B

| | Modified polyolefin-based resin | | | | | |
|---|---|---|---|---|---|---|
| | Molecular weight (weight average) | Melting point (° C.) | Polyolefin-based resin | Ratio of maleic anhydride (% by mass) | Ratio of acrylic acid ester (% by mass) | Carbodiimide compound (equivalent) |
| Example 1B | 80000 | 95 | Ethylene-propylene | 3.0 | 0.0 | 0.02 |
| Example 2B | 80000 | 95 | Ethylene-propylene | 3.0 | 0.0 | 0.10 |
| Example 3B | 80000 | 95 | Ethylene-propylene | 3.0 | 0.0 | 0.50 |
| Example 4B | 80000 | 95 | Ethylene-propylene | 3.0 | 0.0 | 1.00 |
| Example 5B | 80000 | 95 | Ethylene-propylene | 3.0 | 0.0 | 0.10 |
| Example 6B | 80000 | 95 | Ethylene-propylene | 3.0 | 0.0 | 0.10 |
| Example 7B | 80000 | 95 | Ethylene-propylene | 3.0 | 0.0 | 0.10 |
| Example 8B | 80000 | 95 | Ethylene-propylene | 3.0 | 0.0 | 0.10 |
| Example 9B | 80000 | 95 | Ethylene-propylene | 3.0 | 0.0 | 0.10 |
| Example 10B | 110000 | 110 | Ethylene-propylene | 5.0 | 7.0 | 0.10 |
| Example 11B | 90000 | 90 | Ethylene | 8.0 | 0.0 | 0.10 |
| Comparative Example 1B | 80000 | 95 | Ethylene-propylene | 3.0 | 0.0 | 0.00 |
| Comparative Example 2B | 80000 | 95 | Ethylene-propylene | 3.0 | 0.0 | 0.00 |

| | Evaluation of insulation quality | | Evaluation of durability | |
|---|---|---|---|---|
| | Content of other curing agent | Time until short circuit occurred (second) | Peeling strength before durability test (N/15 mm) | Peeling strength after durability test (N/15 mm) |
| Example 1B | 0.00 | 28 | 7.8 | 7.5 |
| Example 2B | 0.00 | 26 | 8.0 | 7.3 |
| Example 3B | 0.00 | 32 | 8.4 | 7.9 |
| Example 4B | 0.00 | 27 | 8.8 | 9.5 |
| Example 5B | 0.10 | 31 | 9.2 | 9.0 |
| Example 6B | 1.00 | 35 | 9.8 | 8.8 |
| Example 7B | 10.00 | 22 | 9.8 | 9.4 |
| Example 8B | 1.00 | 27 | 9.4 | 9.0 |
| Example 9B | 1.00 | 26 | 9.2 | 8.9 |
| Example 10B | 0.00 | 31 | 7.6 | 7.5 |
| Example 11B | 0.00 | 27 | 7.4 | 7.0 |
| Comparative Example 1B | 1.00 | 3 | 8.8 | 3.4 |
| Comparative Example 2B | 10.00 | 8 | 9.2 | 4.7 |

It was revealed that the battery packaging materials of Examples 1B to 11B having an insulating layer formed of a resin composition containing a modified polyolefin resin obtained by modifying a polyolefin resin with maleic anhydride and a carbodiimide compound show a longer time until a short circuit occurred in the case of catching contaminants and higher insulation quality in comparison with the battery packaging materials of Comparative Examples 1B to 2B in which a carbodiimide compound is not used. It was also revealed that in the battery packaging materials of Examples 1B to 11B, adhesion between the metal layer and the sealant layer is improved and the durability is increased. Further, by using carbodiimide and other curing agent, adhesion between the metal layer and the sealant layer was improved.

Examples 1C to 33C and Comparative Examples 1C to 4C

A laminate including a base material layer, an adhesive layer and a metal layer laminated was obtained in the same manner as in Examples 1 to 5 and Comparative Examples 1 to 2. Next, for forming an insulating layer on the other of the surfaces of the aluminum foil of the laminate, a resin composition (ink) containing a modified polyolefin-based resin and a curing agent having the composition as shown in Table 1B was applied so that the thickness was 5 μm and dried. Next, on the dried resin composition, a non-oriented polypropylene film (ethylene-propylene random copolymerized type, melting point: 140° C., thickness: 30 μm) for forming a sealant layer was laminated by a dry lamination method or an extrusion method, and the layers were bonded to obtain a laminate. The obtained laminate was aged for 24 hours under the temperature of 80° C., and further heated for 2 minutes at 190° C. to obtain a battery packaging material of each of Examples 1C to 33C and Comparative Examples 1C to 4C including the base material layer, the adhesive layer, the metal layer, the insulating layer, and the sealant layer laminated in this order.

Example 34C

A laminate in which a base material layer, an adhesive layer, a metal layer, and an insulating layer are laminated was produced in the same manner as in Example 1C. Next, the obtained laminate was subjected to an aging treatment at 80° C. for 24 hours, and then a sealant layer 4 (ethylene-propylene copolymerized type, melting point: 150° C., MFR: 7, thickness: 30 μm) was formed by an extrusion method. Next, the obtained laminate was heated at 190° C. for 2 minutes to obtain a battery packaging material of Example 34C including a base material layer, an adhesive layer, a metal layer, an insulating layer and a sealant layer laminated in this order.

Example 35C

A battery packaging material was obtained in the same manner as in Example 34C except that the aging treatment was not conducted.

Example 36C

A laminate was obtained in the same manner as in Example 1C before conducting the aging treatment. Next, by heating the obtained laminate at 190° C. for 2 minutes, a battery packaging material was obtained.

Example 37C

A laminate was obtained in the same manner as in Example 1C before conducting the aging treatment. Next, after heating the obtained laminate at 190° C. for 2 minutes, aging at 80° C. was conducted for 24 hours to obtain a battery packaging material.

<Evaluation of Durability>

The battery packaging material obtained in each of Examples 1C to 33C and Comparative Examples 1C to 4C was cut to a size of 60 mm (MD direction, longitudinal direction)×150 mm (TD direction, lateral direction). Next, the cut battery packaging material was folded in half with the sealant layers facing each other in the TD direction, and heat-welded on one side with the sealant layers facing each other in the TD direction and on one of the sides in the MD direction to prepare a bag-shaped battery packaging material opened at one side in the TD direction. As conditions for heat-welding, the temperature was 190° C., the surface pressure was 1.0 MPa, and the heating and pressurization time was 3 seconds. Next, 3 g of an electrolytic solution was injected from the opening, and the opening was heat-welded to a width of 7 mm under the same conditions as described above. The electrolytic solution was obtained by mixing lithium phosphate hexafluoride with a solution formed by mixing ethylene carbonate, diethylene carbonate and dimethyl carbonate at a volume ratio of 1:1:1. Next, the battery packaging material was left standing in a thermostatic bath at 85° C. for 24 hours while a part of the battery packaging material where the opening was situated faced upward.

Next, each battery packaging material was taken out from the thermostatic bath, and the battery packaging material was unsealed to remove the electrolytic solution. Next, the folded part of the battery packaging material was cut to a strip with a width of 15 mm to obtain a test piece. The sealant layer and the metal layer of the obtained test piece were drawn at a speed of 50 mm/minute using a tensile tester (AGS-50D (trade name) manufactured by Shimadzu Corporation), and the peeling strength (N/15 mm) of the test piece was measured (peeling strength after durability test). For a test piece obtained by cutting the battery packaging material obtained in each of Examples 1C to 33C and Comparative Examples 1C to 4C to a width of 15 mm, the peeling strength was measured (peeling strength before durability test) in the same manner as described above. The results are shown in Table 1C and Table 2C.

<Evaluation of Insulation Quality to Caught Contaminants)

For the battery packaging material obtained in each of Examples 1C to 33C and Comparative Examples 1C to 4C, insulation quality against caught contaminants was evaluated in the same manner as in Examples 1 to 11 and Comparative Examples 1 to 2. The results are shown in Table 1C and Table 2C.

TABLE 1C

| | Insulating layer | | | Sealant layer forming method | Evaluation of durability Peeling strength (N/15 mm) | | Evaluation of insulation quality Time until short-circuit occurred (second) |
|---|---|---|---|---|---|---|---|
| | Noncrystalline modified polyolefin resin (A) | Modified polyolefin resin having melting point of greater than or equal to 110° C. (B) | Modified polyolefin resin having melting point of less than or equal to 100° C. (C) Curing agent | | Before test | After test | |
| Example 1C | Unsaturated carboxylic acid modified PP 20 parts by mass | Unsaturated carboxylic acid modified PP (Melting point 95° C.) 80 parts by mass | | Dry laminate | 8.6 | 8 | 25 |
| Example 2C | Unsaturated carboxylic acid modified PP 20 parts by mass | Unsaturated carboxylic acid modified PE (Melting point 95° C.) 80 parts by mass | | Dry laminate | 8.4 | 8.3 | 22 |
| Example 3C | Unsaturated carboxylic acid modified PP 20 parts by mass | Unsaturated carboxylic acid modified PP + (meth)acrylic acid ester modified PP (Melting point 90° C.) 80 parts by mass | | Dry laminate | 8.9 | 8.7 | 26 |
| Example 4C | Unsaturated carboxylic acid modified PP 50 parts by mass | (Meth)acrylic acid ester modified PP (Melting point 65° C.) 50 parts by mass | | Dry laminate | 7.7 | 7.5 | 30 |
| Example 5C | Unsaturated carboxylic acid modified PP 50 parts by mass | Unsaturated carboxylic acid modified PP + (meth)acrylic acid ester modified PP (Melting point 90° C.) 50 parts by mass | Epoxy 50 parts by mass | Dry laminate | 7.3 | 7.2 | 25 |
| Example 6C | Unsaturated carboxylic acid modified PP 20 parts by mass | Unsaturated carboxylic acid modified PP + (meth)acrylic acid ester modified PP (Melting point 90° C.) 80 parts by mass | Epoxy 0.1 part by mass | Dry laminate | 8.6 | 8 | 25 |
| Example 7C | Unsaturated carboxylic acid modified PP 80 parts by mass | Unsaturated carboxylic acid modified PP + (meth)acrylic acid ester modified PP (Melting point 90° C.) 20 parts by mass | Isocya 50 part by mass | Dry laminate | 8.9 | 8 | 28 |
| Example 8C | Unsaturated carboxylic acid modified PP 20 parts by mass | Unsaturated carboxylic acid modified PP + (meth)acrylic acid ester modified PP (Melting point 90° C.) 80 parts by mass | Isocya 0.1 part by mass | Dry laminate | 8.8 | 8.1 | 22 |
| Example 9C | Unsaturated carboxylic acid modified PP 30 parts by mass | Unsaturated carboxylic acid modified PP + (meth)acrylic acid ester modified PP (Melting point 90° C.) 70 parts by mass | Carbodi 50 parts by mass | Dry laminate | 8.6 | 8 | 23 |
| Example 10C | Unsaturated carboxylic acid modified PP 20 parts by mass | Unsaturated carboxylic acid modified PP + (meth)acrylic acid ester modified PP (Melting point 90° C.) 80 parts by mass | Carbodi 0.1 part by mass | Dry laminate | 7.9 | 7.9 | 25 |
| Example 11C | Unsaturated carboxylic acid modified PP 80 parts by mass | Unsaturated carboxylic acid modified PP + (meth)acrylic acid ester modified PP (Melting point 90° C.) 20 parts by mass | Oxazoline 50 part by mass | Dry laminate | 8.9 | 8 | 29 |

TABLE 1C-continued

| | Insulating layer | | | Sealant layer forming method | Evaluation of durability Peeling strength (N/15 mm) | | Evaluation of insulation quality Time until short-circuit occurred (second) |
|---|---|---|---|---|---|---|---|
| | Noncrystalline modified polyolefin resin (A) | Modified polyolefin resin having melting point of greater than or equal to 110° C. (B) | Modified polyolefin resin having melting point of less than or equal to 100° C. (C) | Curing agent | | | |
| | | | | | Before test | After test | |
| Example 12C | Unsaturated carboxylic acid modified PP 20 parts by mass | | Unsaturated carboxylic acid modified + (meth)acrylic acid ester modified PP (Melting point 90° C.) 80 parts by mass | Oxazoline 0.1 part by mass | Dry laminate | 9.2 | 9 | 30 |
| Example 13C | Unsaturated carboxylic acid modified PP 50 parts by mass | | Unsaturated carboxylic acid modified + (meth)acrylic acid ester modified PP (Melting point 90° C.) 50 parts by mass | Epoxy + Oxazoline 50 part by mass | Extrusion | 8.6 | 8 | 25 |
| Example 14C | Unsaturated carboxylic acid modified PP 50 parts by mass | | Unsaturated carboxylic acid modified + (meth)acrylic acid ester modified PP (Melting point 90° C.) 50 parts by mass | Isocya + Carbodi 0.1 part by mass | Extrusion | 8.4 | 8 | 25 |
| Example 15C | Unsaturated carboxylic acid modified PP + (meth)acrylic acid ester modified PP 20 parts by mass | | Unsaturated carboxylic acid modified PP (Melting point 95° C.) 80 parts by mass | | Extrusion | 9 | 8 | 24 |
| Example 16C | Unsaturated carboxylic acid modified PP + modified PP having hydroxyl group 20 parts by mass | | Unsaturated carboxylic acid modified PP (Melting point 95° C.) 80 parts by mass | | Extrusion | 8.8 | 7.5 | 40 |
| Example 17C | (Meth)acrylic acid ester modified PP + modified PP having hydroxyl group 20 parts by mass | | Unsaturated carboxylic acid modified PP (Melting point 95° C.) 80 parts by mass | | Extrusion | 9.2 | 7.5 | 36 |
| Example 18C | Unsaturated carboxylic acid modified PP + (meth)acrylic acid ester modified PP + modified PP having hydroxyl group 20 parts by mass | | Unsaturated carboxylic acid modified PP (Melting point 95° C.) 80 parts by mass | | Extrusion | 8.8 | 7.5 | 33 |

TABLE 2C

| | Insulating layer | | | | Sealant layer forming method | Evaluation of durability (N/15 mm) | | Evaluation of insulation quality Time until short-circuit occurred (second) |
|---|---|---|---|---|---|---|---|---|
| | Noncrystalline modified polyolefin resin (A) | Modified polyolefin resin having melting point of greater than or equal to 110° C. (B) | Modified polyolefin resin having melting point of less than or equal to 100° C. (C) | Curing agent | | Before test | After test | |
| Example 19C | | Unsaturated carboxylic acid modified PP (Melting point 145° C.) 50 parts by mass | Unsaturated carboxylic acid modified PP (Melting point 98° C.) 50 parts by mass | | Extrusion | 8.2 | 8.2 | 28 |
| Example 20C | | Unsaturated carboxylic acid modified PE (Melting point 145° C.) 80 parts by mass | Unsaturated carboxylic acid modified PP (Melting point 98° C.) 20 parts by mass | | Extrusion | 8.1 | 7.5 | 23 |
| Example 21C | | Unsaturated carboxylic acid modified PP (Melting point 145° C.) 20 parts by mass | Unsaturated carboxylic acid + (meth)acrylic acid ester modified PP (Melting point 90° C.) 80 parts by mass | | Extrusion | 8.9 | 8 | 20 |
| Example 22C | | Unsaturated carboxylic acid modified PP (Melting point 145° C.) 80 parts by mass | (meth)acrylic acid ester modified PP (Melting point 92° C.) 20 parts by mass | | Extrusion | 9.9 | 9 | 21 |
| Example 23C | | Unsaturated carboxylic acid + (meth)acrylic acid ester modified PP (Melting point 135° C.) 50 parts by mass | Unsaturated carboxylic acid modified PP (Melting point 98° C.) 50 parts by mass | | Extrusion | 8.7 | 8.5 | 30 |
| Example 24C | | Unsaturated carboxylic acid + (meth)acrylic acid ester modified PP (Melting point 135° C.) 80 parts by mass | (meth)acrylic acid ester modified PP (Melting point 98° C.) 20 parts by mass | | Extrusion | 8.7 | 8.5 | 30 |
| Example 25C | | Unsaturated carboxylic acid + (meth)acrylic acid ester modified PP (Melting point 135° C.) 80 parts by mass | Unsaturated carboxylic acid modified PP (Melting point 98° C.) 20 parts by mass | Epoxy + Oxazoline 50 part by mass | Extrusion | 9.2 | 9 | 31 |
| Example 26C | | Unsaturated carboxylic acid + (meth)acrylic acid ester modified PP (Melting point 135° C.) 50 parts by mass | Unsaturated carboxylic acid modified PP (Melting point 98° C.) 50 parts by mass | Isocya + Epoxy 50 part by mass | Dry lamination | 8.8 | 8.2 | 29 |
| Example 27C | | Unsaturated carboxylic acid + (meth)acrylic acid ester modified PP (Melting point 135° C.) 80 parts by mass | Unsaturated carboxylic acid modified PP (Melting point 98° C.) 20 parts by mass | Isocya + Carbodi 0.1 part by mass | Dry lamination | 7.9 | 7.7 | 28 |
| Example 28C | Unsaturated carboxylic acid modified PP 20 parts by mass | Unsaturated carboxylic acid modified PP (Melting point 145° C.) 30 parts by mass | Unsaturated carboxylic acid modified PP (Melting point 98° C.) 50 parts by mass | | Dry lamination | 8.2 | 8.2 | 28 |
| Example 29C | Unsaturated carboxylic acid modified PP 20 parts by mass | Unsaturated carboxylic acid modified PE (Melting point 145° C.) 30 parts by mass | Unsaturated carboxylic acid modified PP (Melting point 98° C.) 50 parts by mass | | Dry lamination | 7.4 | 7.3 | 22 |

TABLE 2C-continued

| | Insulating layer | | | | | Evaluation of durability (N/15 mm) | | Evaluation of insulation quality Time until short-circuit occurred (second) |
|---|---|---|---|---|---|---|---|---|
| | Noncrystalline modified polyolefin resin (A) | Modified polyolefin resin having melting point of greater than or equal to 110° C. (B) | Modified polyolefin resin having melting point of less than or equal to 100° C. (C) | Curing agent | Sealant layer forming method | Before test | After test | |
| Example 30C | Unsaturated carboxylic acid modified PP 20 parts by mass | Unsaturated carboxylic acid modified PP (Melting point 145° C.) 30 parts by mass | Unsaturated carboxylic acid modified PE (Melting point 98° C.) 50 parts by mass | | Extrusion | 7.9 | 7.8 | 23 |
| Example 31C | Unsaturated carboxylic acid modified PP 20 parts by mass | Unsaturated carboxylic acid modified PE (Melting point 145° C.) 30 parts by mass | Unsaturated carboxylic acid modified PE (Melting point 98° C.) 50 parts by mass | | Extrusion | 8 | 7.9 | 27 |
| Example 32C | Unsaturated carboxylic acid modified PP 20 parts by mass | Unsaturated carboxylic acid modified PP (Melting point 145° C.) 30 parts by mass | Unsaturated carboxylic acid modified PP (Melting point 98° C.) 50 parts by mass | Epoxy 0.1 part by mass | Extrusion | 7.4 | 7.3 | 23 |
| Example 33C | Unsaturated carboxylic acid modified PP 20 parts by mass | Unsaturated carboxylic acid modified PP (Melting point 145° C.) 30 parts by mass | Unsaturated carboxylic acid modified PP (Melting point 98° C.) 50 parts by mass | Isocya 50 part by mass | Extrusion | 8.2 | 8.2 | 22 |
| Comparative Examples 1C | Unsaturated carboxylic acid modified PP 20 parts by mass | | Unsaturated carboxylic acid modified PP (Melting point 95° C.) 100 parts by mass | Isocya 20 part by mass | Dry lamination | 8.2 | 8 | 5 |
| Comparative Examples 2C | Unsaturated carboxylic acid modified PP 100 parts by mass | | | Epoxy 10 parts by mass | Dry lamination | 2.5 | 0.6 | 25 |
| Comparative Examples 3C | Unsaturated carboxylic acid modified PP 50 parts by mass | Unsaturated carboxylic acid modified PP (Melting point 145° C.) 50 parts by mass | | | Dry lamination | 3.2 | 0.8 | 35 |
| Comparative Examples 4C | | Unsaturated carboxylic acid modified PP (Melting point 145° C.) 100 parts by mass | | Epoxy + Oxazoline 50 part by mass | Extrusion | 4 | 2.2 | 40 |

As shown in Table 1C and Table 2C, in the battery packaging materials of Examples 1C to 18C using a resin composition containing a noncrystalline modified polyolefin resin (A) and a modified polyolefin resin (C) having a melting point of less than or equal to 100° C. for an insulating layer, the peeling strength is substantially unchanged before and after exposure to the electrolytic solution, revealing that the battery packaging materials are excellent in durability. Further, the battery packaging materials of Examples 1C to 18C show a longer time until a short circuit occurred in the case of catching contaminants, revealing that they are excellent in insulation quality. It was also revealed that the battery packaging materials of Examples 19C to 27C using a resin composition containing a modified polyolefin resin (B) having a melting point of greater than or equal to 110° C., and a modified polyolefin resin (C) having a melting point of less than or equal to 100° C. for an insulating layer are excellent in durability and show high insulation quality. Further it was revealed that the battery packaging materials of Examples 28C to 33C using a resin composition containing a noncrystalline modified polyolefin resin (A), a modified polyolefin resin (B) having a melting point of greater than or equal to 110° C., and a modified polyolefin resin (C) having a melting point of less than or equal to 100° C. for an insulating layer are excellent in durability and shown high insulation quality.

On the other hand, it was revealed that in the battery packaging material of Comparative Example 1C using only a modified polyolefin resin (C) having a melting point of less than or equal to 100° C. for an insulating layer, the durability is excellent, but the time until a short circuit occurred in the case of catching contaminants is short, and hence the insulation quality is low. Also, it was also revealed that in the battery packaging material of Comparative Example 2C using only a noncrystalline modified polyolefin resin (A) for an insulating layer, the insulation quality is high, but the durability is poor. Further, it was revealed that in the battery packaging material of Comparative Example 3C using a noncrystalline modified polyolefin resin (A) and a modified polyolefin resin (B) having a melting point of greater than or equal to 110° C. for an insulating layer, the insulation quality is high, but the durability is poor. Also, it was revealed that also in the battery packaging material of Comparative Example 4C using only a modified polyolefin resin (B) having a melting point of greater than or equal to 110° C. for an insulating layer, the insulation quality is high, but the durability is poor.

DESCRIPTION OF REFERENCE SIGNS

1: Base material layer
2: Metal Layer
3: Insulating layer
4: Sealant layer
5: Adhesive layer
6: Moisture barrier resin layer

The invention claimed is:

1. A battery packaging material comprising a laminate including at least a base material layer, a metal layer, an insulating layer, and a sealant layer laminated in this order, wherein:
the insulating layer is formed of a resin composition containing a modified polyolefin resin modified with an unsaturated carboxylic acid or acid anhydride thereof;
a hardness, when measured by using a nanoindenter and pressing an indenter 5 μm into the insulating layer from a cross-section of the laminate in the laminating direction thereof, ranges from 10 MPa to 300 MPa; and
in the sealant layer, an elastic modulus, when measured by using a nanoindenter and pressing an indenter 5 μm into the sealant layer from a cross-section of the laminate in the laminating direction thereof, ranges from 100 MPa to 1000 MPa.

2. The battery packaging material according to claim 1, wherein the modified polyolefin resin is formed by modifying at least one of a polyethylene-based resin and a polypropylene-based resin with the unsaturated carboxylic acid or acid anhydride thereof.

3. The battery packaging material according to claim 1, wherein the modified polyolefin resin is further modified with a (meth)acrylic acid ester.

4. The battery packaging material according to claim 3, wherein the modified polyolefin resin is formed by modifying at least one of a polyethylene-based resin and a polypropylene-based resin with the unsaturated carboxylic acid or acid anhydride thereof and the (meth)acrylic acid ester.

5. The battery packaging material according to claim 1, wherein a melting point of the insulating layer is lower than a melting point of the sealant layer.

6. The battery packaging material according to claim 1, further including a moisture barrier resin layer between the insulating layer and the sealant layer.

7. The battery packaging material according to claim 1, wherein the metal layer is formed of aluminum foil.

8. The battery packaging material according to claim 1, wherein the modified polyolefin resin is a modified polypropylene-based resin modified with the unsaturated carboxylic acid or acid anhydride thereof and a (meth)acrylic acid ester.

9. The battery packaging material according to claim 1, wherein the resin composition further contains a carbodiimide compound.

10. The battery packaging material according to claim 1, wherein the resin composition contains (i) at least one of a noncrystalline modified polyolefin resin (A) and a modified polyolefin resin (B) having a melting point of greater than or equal to 110° C., and (ii) a modified polyolefin resin (C) having a melting point of less than or equal to 100° C.

11. A battery, wherein a battery element including a positive electrode, a negative electrode and an electrolyte is sealed in the battery packaging material according to claim 1.

12. A method for producing a battery packaging material comprising the step of:
laminating at least a base material layer, a metal layer, an insulating layer, and a sealant layer in this order to obtain a laminate, wherein:
the insulating layer is formed of a resin composition containing a modified polyolefin resin modified with an unsaturated carboxylic acid or acid anhydride thereof;
in the step, the insulating layer having a hardness, when measured by using a nanoindenter and pressing the indenter 5 μm into the insulating layer from a cross-section of the laminate in the laminating direction thereof, ranging from 10 MPa to 300 MPa is formed; and
in the sealant layer, an elastic modulus, when measured by using a nanoindenter and pressing an indenter 5 μm into the sealant layer from a cross-section of the laminate in the laminating direction thereof, ranges from 100 MPa to 1000 MPa.

13. The production method according to claim 12, further comprising, after the step, the step of heating the laminate at a temperature higher or equal to a melting point of the sealant layer.

* * * * *